US012724362B2

(12) United States Patent
Hayashida

(10) Patent No.: US 12,724,362 B2
(45) Date of Patent: Sep. 1, 2026

(54) IMAGE FORMING APPARATUS

(71) Applicant: CANON KABUSHIKI KAISHA, Tokyo (JP)

(72) Inventor: Kei Hayashida, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 19/047,845

(22) Filed: Feb. 7, 2025

(65) Prior Publication Data

US 2025/0271790 A1 Aug. 28, 2025

(30) Foreign Application Priority Data

Feb. 27, 2024 (JP) ................................ 2024-027892

(51) Int. Cl.

| | |
|---|---|
| ***G03G 15/08*** | (2006.01) |
| ***G03G 15/01*** | (2006.01) |
| ***G03G 15/20*** | (2006.01) |

(52) U.S. Cl.

CPC ..... *G03G 15/0891* (2013.01); *G03G 15/0121* (2013.01); *G03G 15/0189* (2013.01); *G03G 15/0865* (2013.01); *G03G 15/2064* (2013.01); *G03G 15/0879* (2013.01)

(58) Field of Classification Search

CPC ........... G03G 15/0891; G03G 15/0121; G03G 15/0189; G03G 15/0865; G03G 15/2064; G03G 15/0877; G03G 15/0879

See application file for complete search history.

(56) References Cited

U.S. PATENT DOCUMENTS

| | | | | | |
|---|---|---|---|---|---|
| 2005/0008398 | A1* | 1/2005 | Hattori | G03G 15/0879 | 399/258 |
| 2013/0266345 | A1* | 10/2013 | Matsumoto | G03G 15/0865 | 399/258 |
| 2018/0335721 | A1* | 11/2018 | Koike | G03G 15/0879 | |

FOREIGN PATENT DOCUMENTS

| | | | |
|---|---|---|---|
| JP | 2016051131 | A | 4/2016 |
| JP | 2023107244 | A | 8/2023 |
| JP | 2023134401 | A | 9/2023 |
| JP | 2023158908 | A | 10/2023 |

* cited by examiner

*Primary Examiner* — Sandra Brase

(74) *Attorney, Agent, or Firm* — ROSSI, KIMMS & McDOWELL LLP

(57) ABSTRACT

An image forming apparatus comprising an apparatus body including a first developing unit including a first developing container and a first developing roller, and a second developing unit including a second developing container and a second developing roller, a first toner container configured to attachably and detachably supported on the apparatus body, the first toner container being configured to supply the first toner together with air toward the first developing container, a second toner container configured to attachably and detachably supported on the apparatus body, the second toner container being configured to supply the second toner together with air toward the second developing container, a pump unit including a first pump and a second pump, and aligned with the first pump in the first direction, and one driving source configured to drive the first pump and second pump.

14 Claims, 10 Drawing Sheets

IMAGE FORMING APPARATUS

BACKGROUND OF THE INVENTION

Field of the Invention

The present invention relates to an image forming apparatus including a pump unit.

Description of the Related Art

Hitherto, an image forming apparatus in which is installed a cartridge equipped with a developing container that accommodates toner and an attachment portion capable of having a supply pack accommodating toner attached thereto is proposed (refer to Japanese Patent Application Laid-Open Publication No. 2023-134401). Toner discharged from the supply pack attached to the attachment portion is accommodated temporarily in a reserve tank disposed on a cartridge, and conveyed from the reserve tank to the developing container. Toner is conveyed from the reserve tank to the developing container by a screw or air flowing from a pump.

SUMMARY OF THE INVENTION

According to a first aspect of the present invention, an image forming apparatus configured to form an image on a sheet, comprising an apparatus body including a first developing unit including a first developing container configured to accommodate a first toner, and a first developing roller configured to bear the first toner, and a second developing unit including a second developing container configured to accommodate a second toner, and a second developing roller configured to bear the second toner, a first toner container configured to accommodate the first toner and attachably and detachably supported on the apparatus body, the first toner container being configured to supply the first toner together with air toward the first developing container, a second toner container configured to accommodate the second toner and attachably and detachably supported on the apparatus body, the second toner container being configured to supply the second toner together with air toward the second developing container, the second toner container being aligned in a first direction with the first toner container, a pump unit including a first pump configured to convey air toward the first toner container, and a second pump configured to convey air toward the second toner container, and aligned with the first pump in the first direction; and one driving source configured to drive the first pump and second pump.

Further features of the present invention will become apparent from the following description of exemplary embodiments with reference to the attached drawings.

DESCRIPTION OF THE EMBODIMENTS

Entire Configuration

An image forming apparatus 100 according to the present embodiment is a laser beam printer that adopts an electrophotographic system. The image forming apparatus refers to an apparatus for forming an image on a sheet used as a recording medium based on an image information entered from an external PC or an image information read from a document, and which includes a printer, a copying machine, a facsimile, and a multifunction machine. Further, the image forming apparatus may have an auxiliary device such as an optional feeder, an image reading apparatus, or a sheet processing apparatus additionally connected to a main body having an image forming function, and the entire system having such an auxiliary device connected thereto is also one kind of an image forming apparatus.

Figure 1:
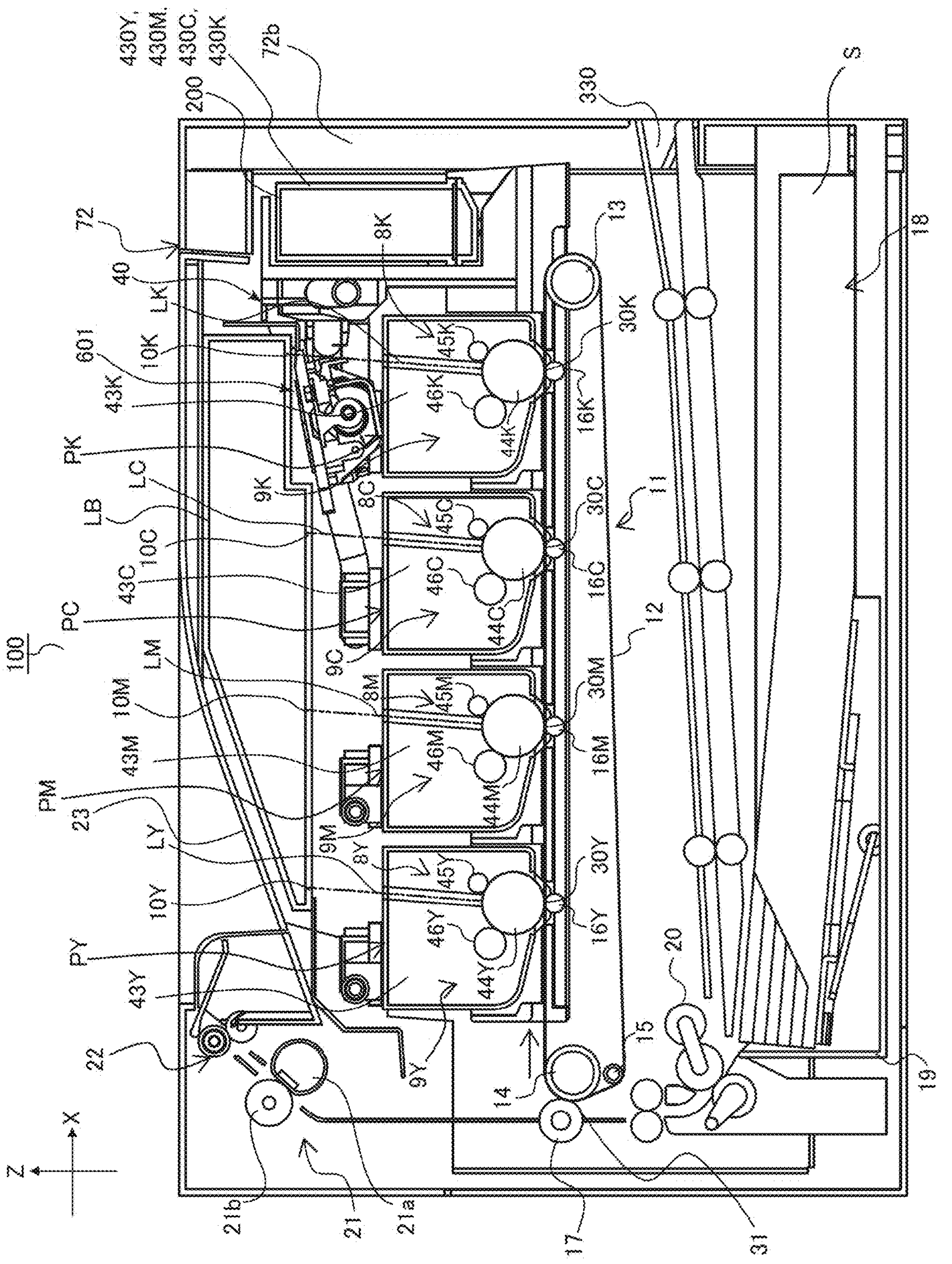
FIG. 1 is an entire schematic view of an image forming apparatus according to a present embodiment.

The image forming apparatus 100 includes, as illustrated in FIG. 1, an image forming portion 40 for forming an image on a sheet S, a sheet feed unit 18, a fixing unit 21, and a sheet discharge roller pair 22. The image forming portion 40 includes four process cartridges PY, PM, PC, and PK for forming toner images of four colors, which are yellow (Y), magenta (M), cyan (C), and black (K), and a laser scanner LB. The laser scanner LB serving as an exposure unit is arranged above the process cartridges PY, PM, PC, and PK. Alternatively, an LED exposure unit may be adopted instead of the laser scanner LB.

The portion excluding the process cartridges PY, PM, PC, and PK and toner cartridges 430Y, 430M, 430C, and 430K described later from the image forming apparatus 100 may be referred to as a main body or an apparatus body 72 of the image forming apparatus 100. In the following description, the toner cartridges 430Y, 430M, 430C, and 430K may simply be referred to as cartridges 430Y, 430M, 430C, and 430K. Further, the toner cartridge 430K is an example of a first toner container capable of supplying black toner together with air to a developing container 43K, and the toner cartridge 430C is an example of a second toner container capable of supplying cyan toner together with air to a developing container 43C. The process cartridges PY, PM, PC, and PK may be attachably and detachably supported on the apparatus body 72 or may be fixed in a non-detachable manner to the apparatus body 72.

In the present embodiment, suffixes P, Y, M, C, and K are attached to reference numbers of components corresponding to the toner colors of yellow, magenta, cyan, and black, respectively. The configurations and operations of components to which the suffixes are attached are approximately the same, except for the different toner colors. Therefore, in the following description, unless distinction is specifically necessary, descriptions may be provided in a general manner with the suffixes Y to K omitted.

Further, in the following description, unless denoted otherwise, directions X, Y, and Z are defined as follows, assuming that the process cartridges PY, PM, PC, and PK and the toner cartridges 430Y, 430M, 430C, and 430K take their normal positions, that is, the positions that they take when being attached to the apparatus body 72.

Figure 2A:
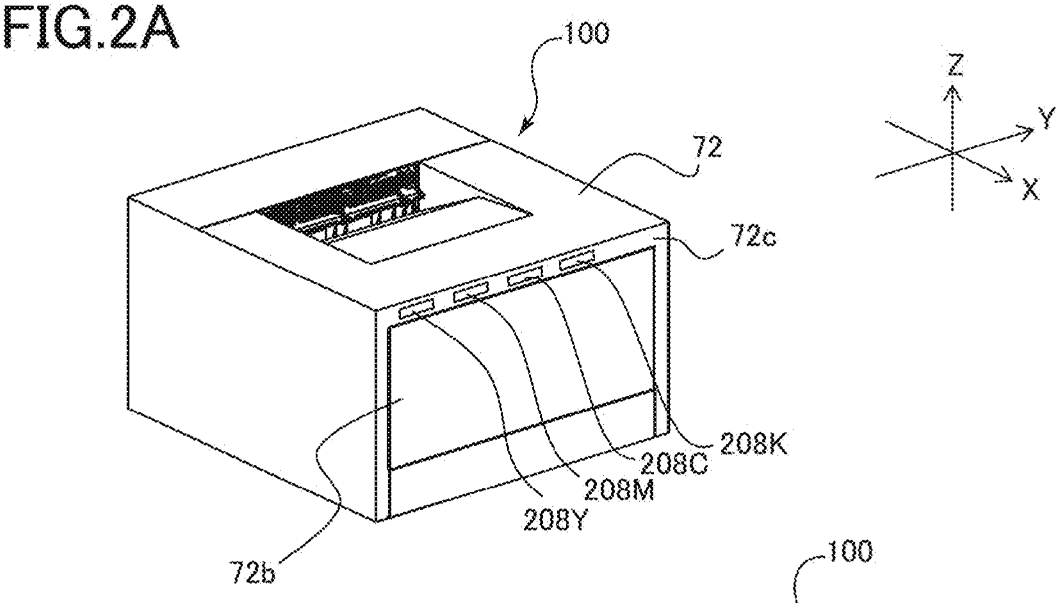
FIG. 2A is a perspective view of the image forming apparatus.

As illustrated in FIG. 2A, a front-rear direction is denoted by an X axis, and a direction from a rear side toward a front side of the image forming apparatus 100 is referred to as an X direction. The X direction may also be referred to as a second direction, a forward direction, a front direction, or an attachment/detachment direction of the toner cartridge. Further, a downstream side in the X direction of the image forming apparatus 100 may be referred to as a front side, and an upstream side thereof may be referred to as a rear side.

A right-left direction is denoted by a Y axis, and a direction from left to right of the image forming apparatus 100 is referred to as a Y direction. The Y direction may also be referred to as a direction of rotational axis AL1, a first direction, and a right direction. Further, a downstream side in the Y direction of the image forming apparatus 100 may be referred to as a right side, and the upstream side thereof may be referred to as a left side.

An up-down direction is denoted by a Z axis, and a direction from a lower side toward an upper side of the image forming apparatus 100 is referred to as a Z direction. The Z direction may also be referred to as a third direction, an upper direction, a height direction, and a vertical direction. Further, a downstream side in the Z direction of the image forming apparatus 100 may be referred to as an upper side, an upper surface side, and a top surface side, whereas an upstream side thereof may be referred to as a lower side, a lower surface side, and a bottom surface side.

The X axis, the Y axis, and the Z axis are mutually perpendicular to each other. For example, the X axis is perpendicular to the Y axis, and also perpendicular to the Z axis. A plane perpendicular to the X axis may be referred to as a YZ plane, a plane perpendicular to the Y axis may be referred to as a ZX plane, and a plane perpendicular to the Z axis may be referred to as a XY plane. For example, the XY plane is a horizontal plane. The X direction and the Y direction are directions along the horizontal XY plane, that is, the horizontal direction.

The process cartridge PY includes a drum unit 8Y and a developing unit 9Y. The drum unit 8Y includes a photosensitive drum 44Y and a charging roller 45Y. The photosensitive drum 44Y is formed by applying an organic photoconductive layer on an outer circumference of an aluminum cylinder, and is rotated by a drive motor not shown. A photosensitive belt may be used instead of the photosensitive drum 44Y. The developing unit 9Y includes a developing container 43Y that accommodates yellow toner, and a developing roller 46Y that develops an electrostatic latent image on the photosensitive drum 44Y.

Similarly, the process cartridge PM includes a drum unit 8M and a developing unit 9M. The drum unit 8M includes a photosensitive drum 44M and a charging roller 45M. The photosensitive drum 44M is formed by applying an organic photoconductive layer on an outer circumference of an aluminum cylinder, and is rotated by a drive motor not shown. A photosensitive belt may be used instead of the photosensitive drum 44M. The developing unit 9M includes a developing container 43M that accommodates magenta toner, and a developing roller 46M that develops an electrostatic latent image on the photosensitive drum 44M.

Similarly, the process cartridge PC includes a drum unit 8C and a developing unit 9C. The drum unit 8C includes a photosensitive drum 44C serving as a second photosensitive drum and a charging roller 45C. The photosensitive drum 44C is formed by applying an organic photoconductive layer on an outer circumference of an aluminum cylinder, and is rotated by a drive motor not shown. A photosensitive belt may be used instead of the photosensitive drum 44C. The developing unit 9C serving as a second developing unit includes a developing container 43C that accommodates cyan toner, and a developing roller 46C that develops an electrostatic latent image on the photosensitive drum 44C. That is, the developing container 43C serving as a second developing container is configured to accommodate cyan toner serving as a second toner, and the developing roller 46C serving as a second developing roller is configured to bear cyan toner. The developing units 9Y and 9M may each be assumed as the second developing unit.

Similarly, the process cartridge PK includes a drum unit 8K and a developing unit 9K. The drum unit 8K includes a photosensitive drum 44K serving as a first photosensitive drum, and a charging roller 45K. The photosensitive drum 44K is formed by applying an organic photoconductive layer on an outer circumference of an aluminum cylinder, and is rotated by a drive motor not shown. A photosensitive belt may be used instead of the photosensitive drum 44K. The developing unit 9K serving as a first developing unit includes a developing container 43K that accommodates black toner, and a developing roller 46K that develops an electrostatic latent image on the photosensitive drum 44K. That is, the developing container 43K serving as a first developing container is configured to accommodate black toner serving as a first toner, and the developing roller 46K serving as a first developing roller is configured to bear black toner.

These four process cartridges PY, PM, PC, and PK are arranged in an aligned manner in the X direction. Further, an intermediate transfer belt unit 11 is disposed below the process cartridges PY, PM, PC, and PK in the image forming portion 40. The intermediate transfer belt unit 11 includes an intermediate transfer belt 12 wound around a drive roller 14, a tension roller 13, and an assist roller 15, and a secondary transfer roller 17, and the intermediate transfer belt 12 is rotated by the drive roller 14 in a clockwise direction in FIG. 1. Primary transfer rollers 16Y, 16M, 16C, and 16K are disposed on an inner side of the intermediate transfer belt 12.

The primary transfer rollers 16Y, 16M, 16C, and 16K each come into contact with the photosensitive drums 44Y, 44M, 44C, and 44K, thereby forming primary transfer portions 30Y, 30M, 30C, and 30K. The secondary transfer roller 17 is arranged to face the drive roller 14 with the intermediate transfer belt 12 interposed therebetween. The secondary transfer roller 17 and the intermediate transfer belt 12 come into contact with each other and form a secondary transfer portion 31.

The fixing unit 21 includes a fixing film 21*a* heated by a heater, and a pressure roller 21*b* that comes into pressure contact with the fixing film 21*a*. The sheet feed unit 18 is disposed on a lower portion of the image forming apparatus 100. The sheet feed unit 18 includes a feeding cassette 19 that may be drawn out of and attached to the apparatus body 72, and a feed roller 20 that feeds sheets S accommodated in the feeding cassette 19. Further, the sheet feed unit 18 includes a manual sheet feed port 330 through which sheets are manually inserted. Sheets may include paper such as normal paper and envelopes, plastic films as overhead projector (OHP) sheets, and cloths.

Image Forming Operation

Next, an image forming operation of the image forming apparatus 100 configured in this manner will be described. When an image signal is entered to the laser scanner LB from a personal computer not shown, laser lights LY, LM, LC, and LK corresponding to the image signal are irradiated from the laser scanner LB. The laser lights LY, LM, LC, and LK for exposing the respective photosensitive drums are irradiated on the photosensitive drums 44Y, 44M, 44C, and 44K through exposure windows 10Y, 10M, 10C, and 10K of the laser scanner LB.

In this state, a surface of the photosensitive drum 44Y is charged uniformly in advance to a predetermined polarity and potential by the charging roller 45Y, and an electrostatic latent image is formed on the surface by being irradiated with a laser light LY from the laser scanner LB. The electrostatic latent image formed on the photosensitive drum 44Y is developed by the developing roller 46Y, and a yellow (Y) toner image is formed on the photosensitive drum 44Y.

Similarly, magenta (M), cyan (C), and black (K) toner images are formed respectively on the photosensitive drums 44M, 44C, and 44K. The toner images of respective colors formed on the respective photosensitive drums are transferred to the intermediate transfer belt 12 by the primary transfer rollers 16Y, 16M, 16C, and 16K, and conveyed on the intermediate transfer belt 12 being rotated by the drive roller 14 to the secondary transfer roller 17.

The image forming processes of the respective colors are performed at a timing such that each toner image is superposed on a toner image formed upstream therefrom and primarily transferred to the intermediate transfer belt 12. Further, after the toner images of the respective colors have been transferred to the intermediate transfer belt 12, toner remaining on the surface of the respective photosensitive drums are removed by a cleaning device not shown.

In parallel with the above-mentioned image forming process, the sheet S accommodated in the feeding cassette 19 of the sheet feed unit 18 or the sheet supplied from the manual sheet feed port 330 are conveyed toward the secondary transfer portion 31. In the secondary transfer portion 31, a full-color toner image on the intermediate transfer belt 12 is transferred to the sheet S by a secondary transfer bias applied to the secondary transfer roller 17. Predetermined heat and pressure is applied from the fixing film 21*a* and the pressure roller 21*b* of the fixing unit 21 to the sheet S to which the toner image has been transferred, by which the toner is melted and fixed. The sheet S having passed through the fixing unit 21 is discharged in a direction along the X direction by the sheet discharge roller pair 22, and supported on a sheet discharge tray 23 disposed on an upper portion of the apparatus body 72.

General Configuration of Toner Cartridge

Next, a general configuration of the toner cartridges 430Y, 430M, 430C, and 430K will be described with reference to FIGS. 2A to 2C. FIG. 2A is a perspective view of the image forming apparatus 100, FIG. 2B is a perspective view of the image forming apparatus 100 in a state where a front door 72*b* is opened, and FIG. 2C is a perspective view of the image forming apparatus 100 in a state where the toner cartridge 430Y is removed.

As illustrated in FIG. 2A, the image forming apparatus 100 includes the front door 72*b* that is supported in an openable/closable manner on the casing of the apparatus body 72. The front door 72*b* covers an opening 72*a* provided on a front portion, that is, a downstream end portion in the X direction, of the apparatus body 72 by being positioned in a closed position, as illustrated in FIGS. 2A and 2B. Further, the front door 72*b* opens the opening 72*a* of the apparatus body 72 by being positioned at an open position, as illustrated in FIG. 2B. The front door 72*b* may maintain its position at the open position.

Figure 2B:
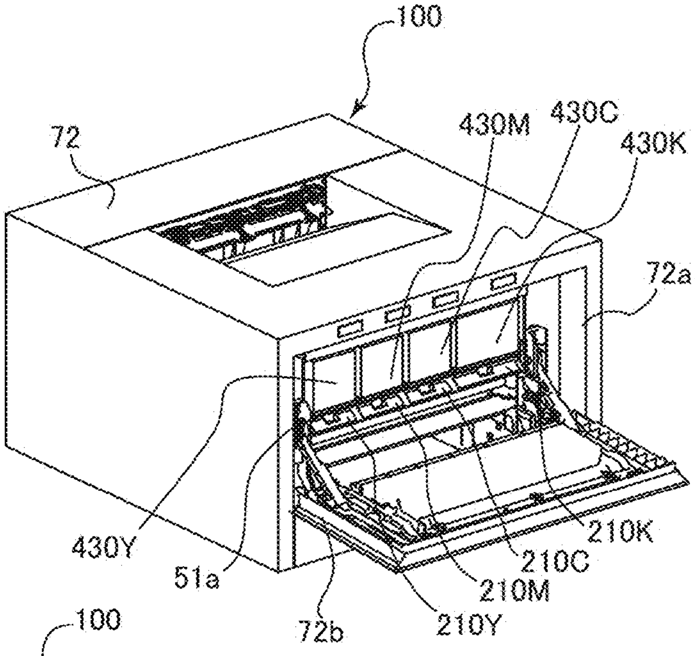
FIG. 2B is a perspective view of the image forming apparatus with a front door opened.
Figure 2C:
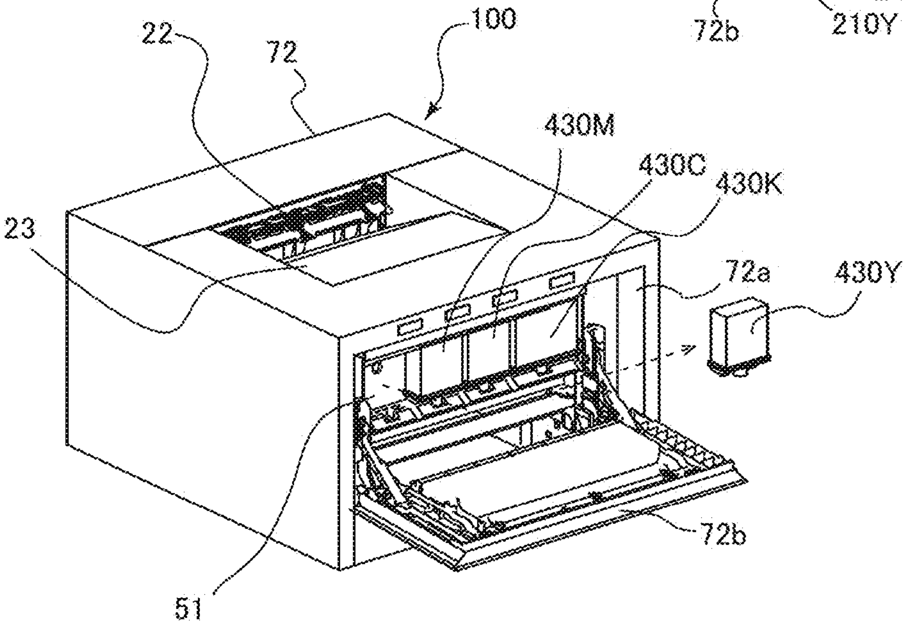
FIG. 2C is a perspective view of the image forming apparatus with a toner cartridge removed.

As illustrated in FIG. 2B, when the front door 72*b* is opened from the closed position to the open position, the toner cartridges 430Y, 430M, 430C, and 430K are exposed to the exterior of the image forming apparatus 100 through the opening 72*a*. Therefore, the user may access the toner cartridges 430Y, 430M, 430C, and 430K. The toner cartridges 430Y, 430M, 430C, and 430K may supply toner to the developing containers 43Y, 43M, 43C, and 43K of the process cartridges PY, PM, PC, and PK.

The toner cartridges 430Y, 430M, 430C, and 430K are arranged downstream in the X direction and downstream in the Z direction of the apparatus body 72, that is, on the front side and upper side of the apparatus body 72. In other words, the toner cartridges 430Y, 430M, 430C, and 430K are arranged downstream of the apparatus body 72 in a sheet discharge direction of the sheet discharge roller pair 22. The toner cartridges 430Y, 430M, 430C, and 430K are arranged in an aligned manner in the Y direction as an alignment direction. That is, the X direction, which is the direction of alignment of the process cartridges PY, PM, PC, and PK, and the Y direction, which is the direction of alignment of the toner cartridges 430Y, 430M, 430C, and 430K, are mutually orthogonal.

As illustrated in FIG. 2C, the toner cartridges 430Y, 430M, 430C, and 430K are attachably and detachably supported in the X direction with respect to a cartridge holder 51 disposed on the apparatus body 72. That is, an X direction, and similarly the −X direction, serving as a second direction intersecting the Y direction is the attachment/detachment direction of the toner cartridges 430Y, 430M, 430C, and 430K. Therefore, the toner cartridges 430Y, 430M, 430C, and 430K may be replaced without having to remove the process cartridges PY, PM, PC, and PK from the apparatus body 72. The toner cartridges 430Y, 430M, 430C, and 430K are arranged on a front side of the apparatus body 72 and are exposed by opening the front door 72*b*, such that the cartridges may be replaced easily.

The cartridge holder 51 is arranged on the front side of the apparatus body 72 and downstream of the process cartridges PY, PM, PC, and PK in the X direction. Therefore, even in a case where the toner cartridges 430Y, 430M, 430C, and 430K are removed from the cartridge holder 51, the process cartridges PY, PM, PC, and PK are covered by the cartridge holder 51 and are not exposed to the exterior of the image forming apparatus 100 through the opening 72*a*. The toner cartridges 430Y, 430M, 430C, and 430K are stored in the apparatus body 72 in a state where the front door 72*b* is positioned at the closed position.

Further, as illustrated in FIG. 2A, indicators 208Y, 208M, 208C, and 208K are disposed on a front side 72*c* of the apparatus body 72. The indicators 208Y, 208M, 208C, and 208K are for indicating the colors of toners accommodated in each of the toner cartridges 430Y, 430M, 430C, and 430K to the user in an easily recognizable manner. The indicators 208Y, 208M, 208C, and 208K may be composed of LED or stickers, and for example, the indicator 208Y may be composed of an LED that is lit or flashed in yellow, or a sticker colored in yellow. Further, the indicators 208Y, 208M, 208C, and 208K may be provided with a function to display a remaining amount of toner accommodated in each of the corresponding process cartridges PY, PM, PC, and PK.

As illustrated in FIG. 2B, an inclined portion 51*a* is formed on a lower portion of the cartridge holder 51. The inclined portion 51*a* is an inclined surface facing an oblique upper direction. In other words, the inclined portion 51*a* is an inclined surface that extends downstream in the Z direction toward an upstream side in the X direction. Labels 210Y, 210M, 210C, and 210K corresponding to toner colors accommodated in the toner cartridges 430Y, 430M, 430C, and 430K are attached to the inclined portion 51*a*. For example, the labels 210Y, 210M, 210C, and 210K may be colored in yellow, magenta, cyan, and black, or have the letters yellow, magenta, cyan, and black printed thereon. The user may visually confirm the labels 210Y, 210M, 210C, and 210K attached to the inclined portion 51*a* when replacing the toner cartridges 430Y, 430M, 430C, and 430K. Therefore, the user may attach the respective toner cartridges to the appropriate positions.

Image Forming Unit

Figure 3A:
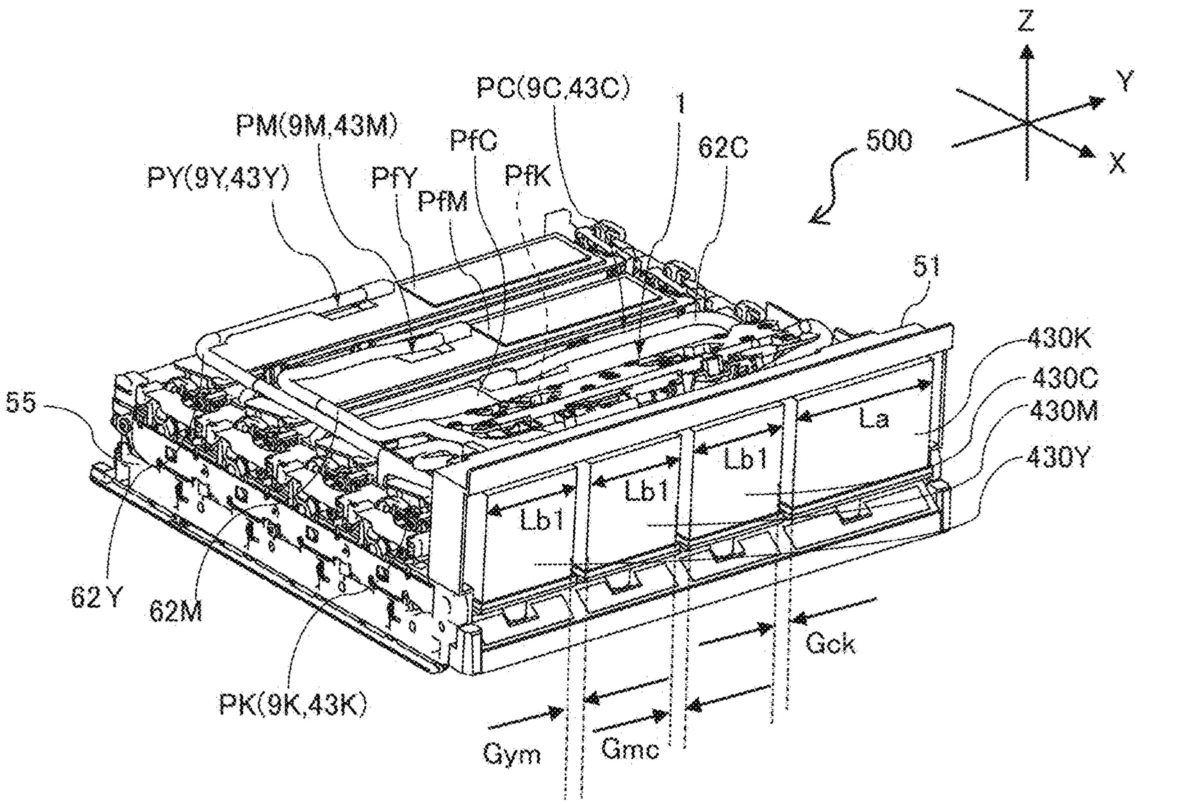
FIG. 3A is a perspective view of an image forming unit.

Next, an image forming unit 500 including a toner conveyance mechanism for conveying toner to the process cartridges PY, PM, PC, and PK from the toner cartridges 430Y, 430M, 430C, and 430K will be described with reference to FIGS. 3A to 5B. FIG. 3A is a perspective view of the image forming unit 500, and FIG. 3B is a perspective view of the image forming unit 500 in a state where the toner cartridges 430Y, 430M, 430C, and 430K are removed.

Figure 4A:
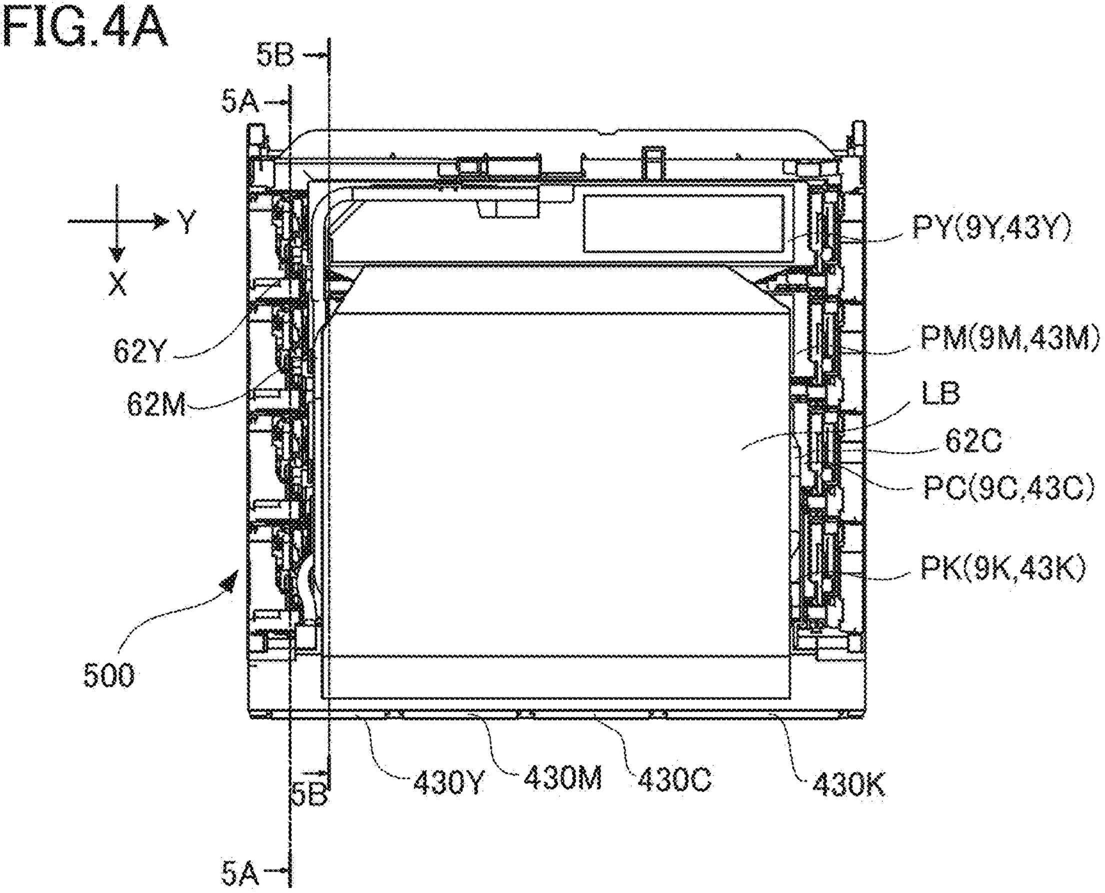
FIG. 4A is a plan view of a laser scanner and the image forming unit.
Figure 4B:
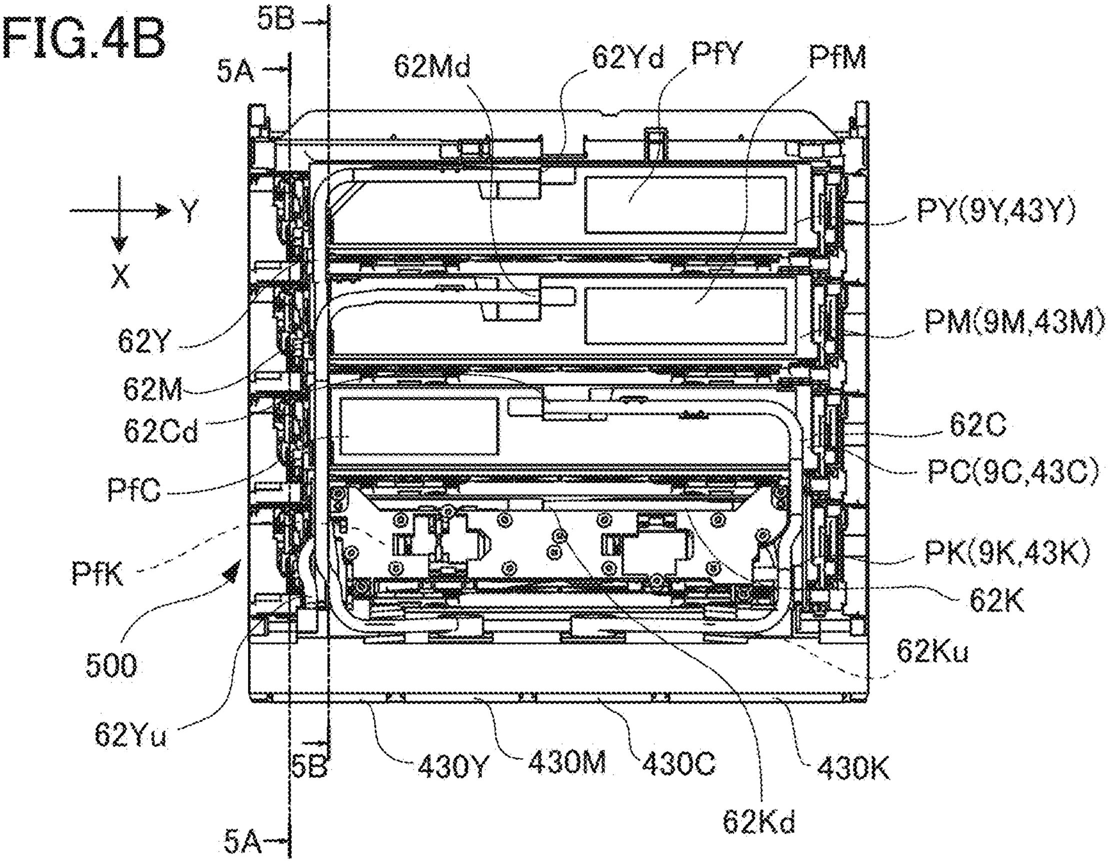
FIG. 4B is a plan view of the image forming unit.
Figure 5A:
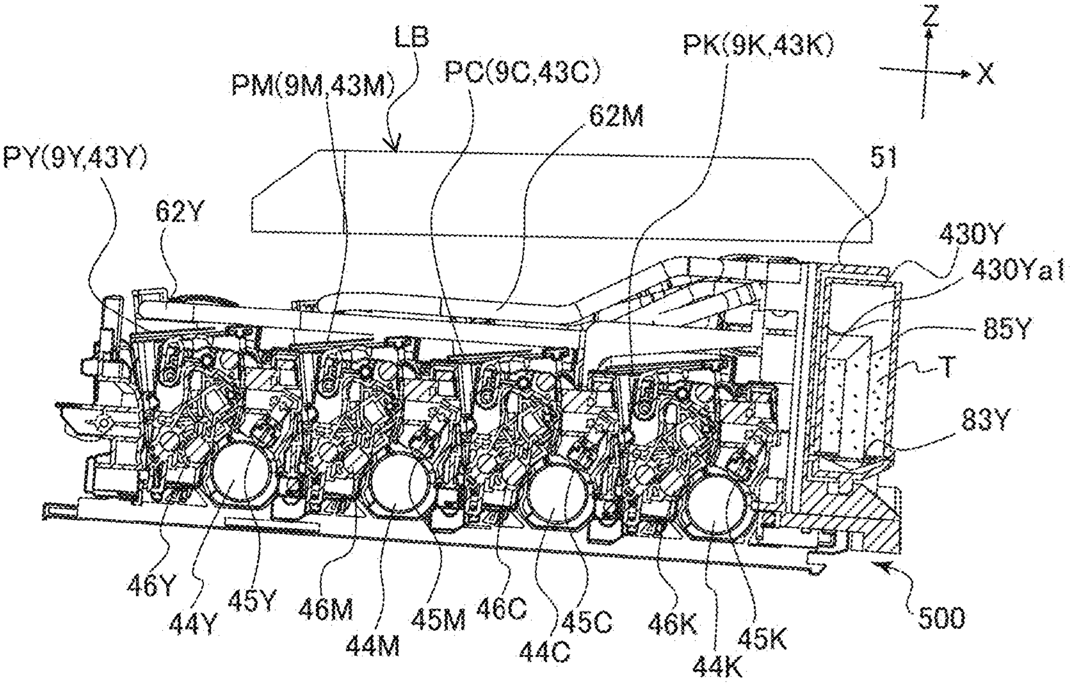
FIG. 5A is a cross-sectional view taken at a 5A-5A cross-section of FIG. 4A.
Figure 5B:
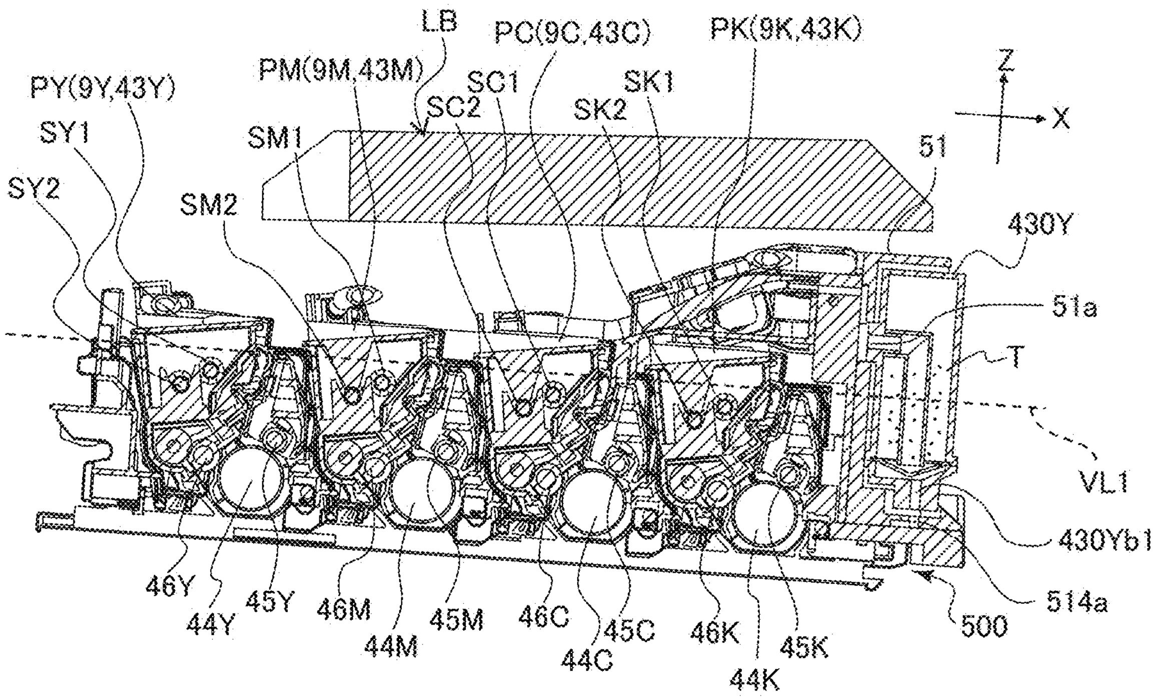
FIG. 5B is a cross-sectional view taken at a 5B-5B cross-section of FIG. 4A.

FIG. 4A is a plan view of the laser scanner LB and the image forming unit 500, and FIG. 4B is a plan view of the image forming unit 500. FIG. 5A is a cross-sectional view showing a 5A-5A cross-section of FIG. 4A, and FIG. 5B is a cross-sectional view showing a 5B-5B cross-section of FIG. 4A.

Figure 3B:
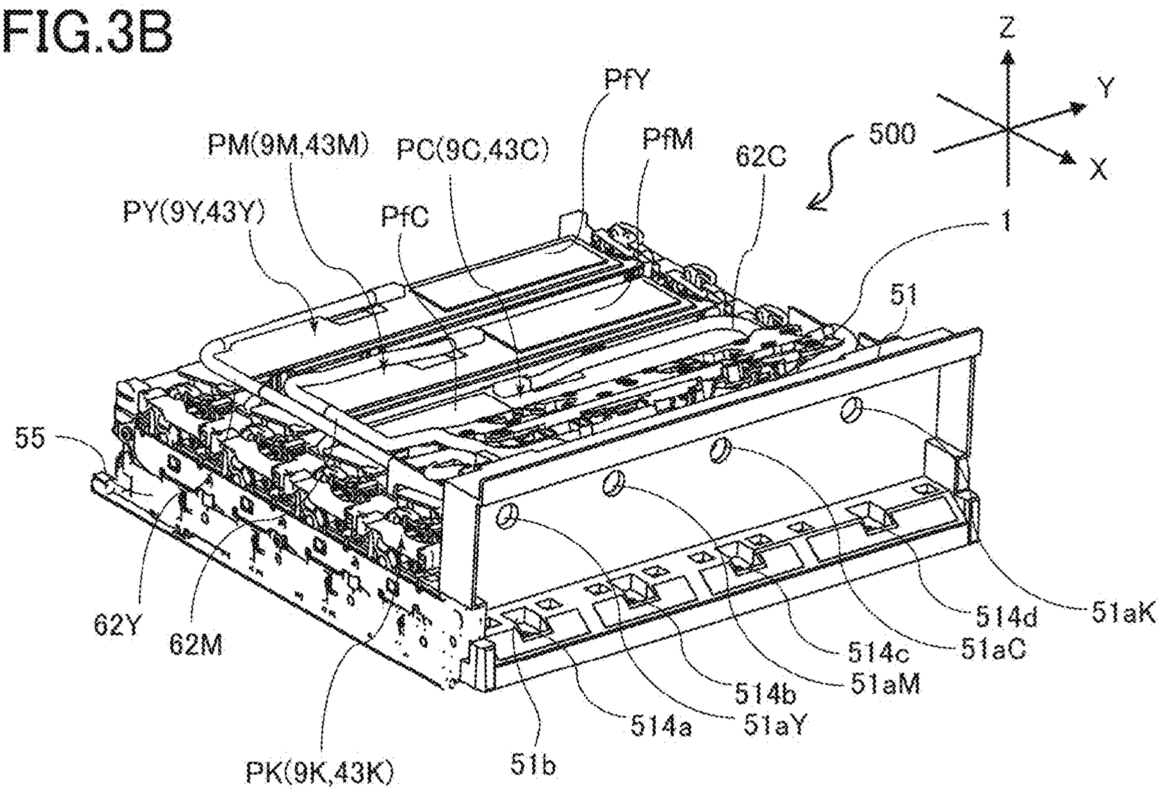
FIG. 3B is a perspective view of the image forming unit with the toner cartridge removed.

The image forming unit 500 includes, as illustrated in FIGS. 3A and 3B, the process cartridges PY, PM, PC, and PK, the toner cartridges 430Y, 430M, 430C, and 430K, the cartridge holder 51, and a pump unit 1. The pump unit 1 is arranged on a rear direction of the cartridge holder 51 and an upper direction of the process cartridge PK, as illustrated in FIGS. 1 and 3A.

As illustrated in FIG. 3B, air conveyed from the pump unit 1 is discharged through discharge holes 514*a*, 514*b*, 514*c*, and 514*d* disposed on the cartridge holder 51. The discharge holes 514*a*, 514*b*, 514*c*, and 514*d* are opened upward, that is, in the Z direction.

Further, inlet ports 51*a*Y, 51*a*M, 51*a*C, and 51*a*K are formed on the cartridge holder 51. The inlet ports 51*a*Y, 51*a*M, 51*a*C, and 51*a*K are through holes formed on a rear surface of the cartridge holder 51. The opening direction of the inlet ports 51*a*Y, 51*a*M, 51*a*C, and 51*a*K are the X direction, such that they intersect with the Z direction, which is the opening direction of the discharge holes 514*a*, 514*b*, 514*c*, and 514*d*.

In a state where the toner cartridges 430Y, 430M, 430C, and 430K are attached to the cartridge holder 51, air discharged through the discharge holes 514*a*, 514*b*, 514*c*, and 514*d* are supplied to the interior of the toner cartridges 430Y, 430M, 430C, and 430K. Then, toner discharged together with air from the toner cartridges 430Y, 430M, 430C, and 430K are conveyed through the inlet ports 51*a*Y, 51*a*M, 51*a*C, and 51*a*K of the cartridge holder 51 to supply pipes 62Y, 62M, 62C, and 62K.

As illustrated in FIG. 4B, the supply pipes 62Y, 62M, 62C, and 62K include upstream end portions 62Yu, 62Mu, 62Cu, and 62Ku respectively connected to the inlet ports 51*a*Y, 51*a*M, 51*a*C, and 51*a*K, and downstream end portions 62Yd, 62Md, 62Cd, and 62Kd respectively connected to the developing containers 43Y, 43M, 43C, and 43K.

Then, toner discharged together with air from the toner cartridges 430Y, 430M, 430C, and 430K are passed through the supply pipes 62Y, 62M, 62C, and 62K and supplied to the developing containers 43Y, 43M, 43C, and 43K.

The supply pipes 62Y and 62M are respectively routed on an upstream end side in the Y direction of the developing containers 43Y and 3M. The supply pipes 62C and 62K are respectively routed on a downstream end side in the Y direction of developing containers 43C and 3K. As described, by separating the supply pipes 62Y, 62M, 62C, and 62K to be respectively routed on either the left side or the right side of the developing containers 43Y, 43M, 43C, and 43K, the lengths of the supply pipes 62Y, 62M, 62C, and 62K may be shortened. Therefore, pressure loss in the supply pipes 62Y, 62M, 62C, and 62K may be reduced, and the image forming unit 500 may be downsized.

Next, an arrangement of the toner cartridge 430Y will be described. As illustrated in FIG. 5B, the toner cartridge 430Y and the process cartridges PY, PM, PC, and PK are arranged to overlap with a virtual line VL1 that extends in the X direction. That is, as illustrated in FIGS. 1 and 5B, the toner cartridges 430Y, 430M, 430C, and 430K are arranged in an aligned manner with the process cartridges PY, PM, PC, and PK in the X direction. In other words, when viewed in the X direction, at least a portion of each of the toner cartridges 430Y, 430M, 430C, and 430K are arranged to be overlapped with the process cartridges PY, PM, PC, and PK in the Z direction. Therefore, the image forming unit 500 may be downsized in the Z direction, that is, in the up-down direction, and the image forming apparatus 100 may be downsized.

In the present embodiment, the toner cartridges 430Y, 430M, 430C, and 430K are arranged as described above, but the present technique is not limited thereto. That is, the toner cartridges 430Y, 430M, 430C, and 430K may be arranged above the process cartridges PY, PM, PC, and PK in the Z direction.

Further, the image forming unit 500 should preferably adopt a configuration that allows easy access to the process cartridges PY, PM, PC, and PK and the supply pipes 62Y, 62M, 62C, and 62K so as to realize maintenance and replacement of the process cartridges PY, PM, PC, and PK and the supply pipes 62Y, 62M, 62C, and 62K. Therefore, according to the present embodiment, the image forming unit 500 includes a tray 55 that supports the process cartridges PY, PM, PC, and PK and the cartridge holder 51. The tray 55 is configured to be drawn out in the X direction from the apparatus body 72. The user may easily access the process cartridges PY, PM, PC, and PK, the toner cartridges 430Y, 430M, 430C, and 430K supported by the cartridge holder 51, and the pump unit 1 by drawing out the tray 55 in the X direction in a state where the front door 72*b* is opened.

Pump Unit

Figure 6:
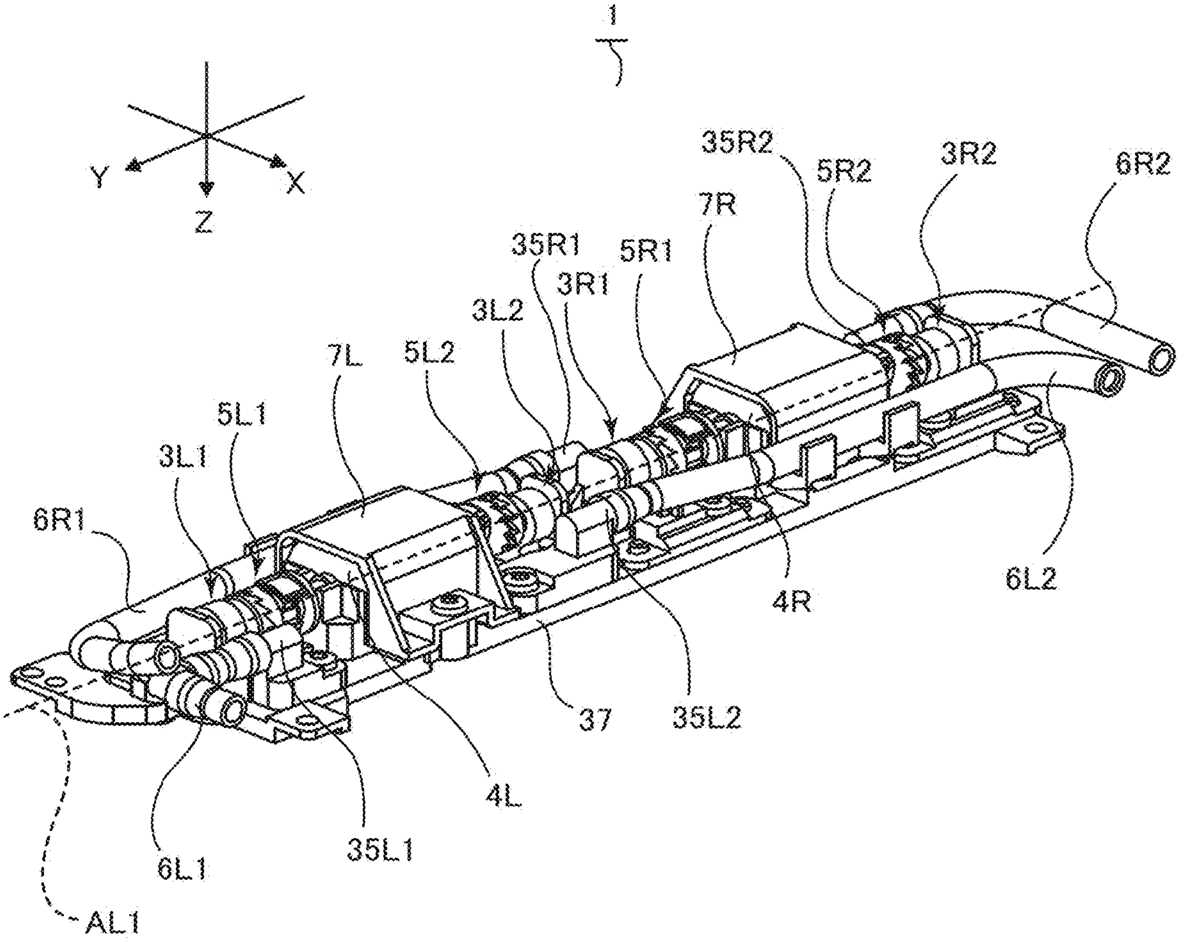
FIG. 6 is a perspective view of a pump unit.
Figure 7:
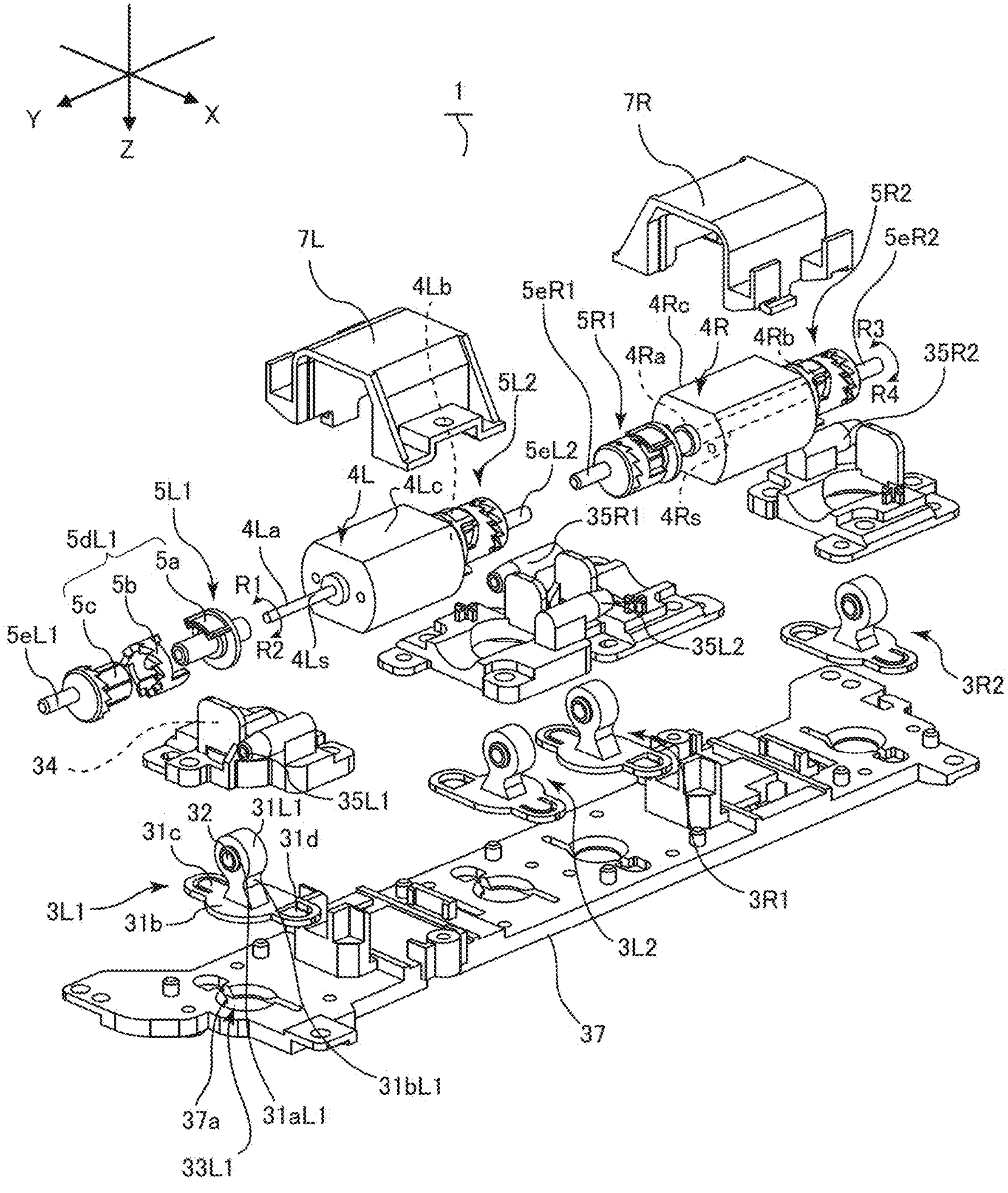
FIG. 7 is an exploded perspective view of the pump unit.

Next, the pump unit 1 will be described with reference to FIGS. 6 and 7. FIG. 6 is a perspective view illustrating the pump unit 1 according to the present embodiment. FIG. 7 is a exploded perspective view of the pump unit 1. The pump unit 1 illustrated in FIGS. 6 and 7 is positioned in a state where the pump unit 1 illustrated in FIGS. 1 to 5B is rotated by 180 degrees about the X axis. In other words, a short direction of the pump unit 1 is denoted by the X axis, and a direction from the rear side toward the front side of the pump unit 1 is referred to as the X direction. A rotation shaft direction of a first dual shaft motor 4L and a second dual shaft motor 4R of the pump unit 1 is denoted by the Y axis, and a direction from the second dual shaft motor 4R toward the first dual shaft motor 4L is referred to as the Y direction. The Y direction is sometimes referred to as an axial direction or a longitudinal direction. An up-down direction of the pump unit 1 is denoted by the Z axis, and the Z direction may be referred to as a height direction or a vertical direction.

The pump unit 1 includes, as illustrated in FIGS. 6 and 7, the first dual shaft motor 4L, the second dual shaft motor 4R, a first drive transmission portion 5L1, a second drive transmission portion 5L2, a third drive transmission portion 5R1, and a fourth drive transmission portion 5R2. The pump unit 1 includes a first pump 3L1, a second pump 3L2, a third pump 3R1, a fourth pump 3R2, a first holding member 7L, a second holding member 7R, a first pipe 6L1, a second pipe 6L2, a third pipe 6R1, and a fourth pipe 6R2.

The first pump 3L1 conveys, or sends out, air to the first pipe 6L1 by having the drive of the first dual shaft motor 4L transmitted via the first drive transmission portion 5L1. The first pipe 6L1 is connected to a flow path not shown disposed within the cartridge holder 51. The air sent to the first pipe 6L1 is conveyed through the flow path to the discharge hole 514*d*. The discharge hole 514*d* is connected to an intake port of the toner cartridge 430K described below, and air is supplied through the discharge hole 514*d* to the toner cartridge 430K.

The second pump 3L2 conveys air to the second pipe 6L2 by having the drive of the first dual shaft motor 4L transmitted via the second drive transmission portion 5L2. The second pipe 6L2 is connected to a flow path not shown disposed within the cartridge holder 51. The air sent to the second pipe 6L2 is conveyed through the flow path to the discharge hole 514*c*. The discharge hole 514*c* is connected to an intake port of the toner cartridge 430C described below, and air is supplied through the discharge hole 514*d* to the toner cartridge 430C.

The third pump 3R1 conveys air to the third pipe 6R1 by having the drive of the second dual shaft motor 4R transmitted via the third drive transmission portion 5R1. The third pipe 6R1 is connected to a flow path not shown disposed within the cartridge holder 51. The air sent to the third pipe 6R1 is conveyed through the flow path to the discharge hole 514*b*. The discharge hole 514*b* is connected to an intake port of the toner cartridge 430M described below, and air is supplied through the discharge hole 514*b* to the toner cartridge 430M.

The fourth pump 3R2 conveys air to the fourth pipe 6R2 by having the drive of the second dual shaft motor 4R transmitted via the fourth drive transmission portion 5R2. The fourth pipe 6R2 is connected to a flow path not shown disposed within the cartridge holder 51. The air sent to the fourth pipe 6R2 is conveyed through the flow path to the discharge hole 514*a*. The discharge hole 514*a* is connected to an intake port 430Yb1 of the toner cartridge 430Y described below, and air is supplied through the discharge hole 514*b* to the toner cartridge 430Y.

The respective flow paths disposed in the cartridge holder 51 are formed independently within the cartridge holder 51, and are not mutually communicated with each other.

The pump unit 1 includes an attachment member 37, and the first dual shaft motor 4L is held by the first holding member 7L attached to the attachment member 37. The second dual shaft motor 4R is held by the second holding member 7R attached to the attachment member 37.

The first dual shaft motor 4L serving as a motor includes a first rotation shaft 4Ls serving as a rotation shaft that extends in the Y direction, and a first casing 4Lc that rotatably supports the first rotation shaft 4Ls. The first rotation shaft 4Ls passes through the first casing 4Lc, and is configured rotatably about a rotational axis AL1 in a first rotation direction R1 and a second rotation direction R2 opposite to the first rotation direction R1. Further, the first rotation shaft 4Ls includes a first projection portion 4La that projects from one side of the first casing 4Lc in the Y direction, and a second projection portion 4Lb that projects from the other side of the first casing 4Lc. The first projection portion 4La serving as a first end portion is disposed on one side of the first rotation shaft 4Ls in the Y direction, and a second projection portion 4Lb serving as a second end portion is disposed on the other side of the first rotation shaft 4Ls in the Y direction.

The second dual shaft motor 4R includes a second rotation shaft 4Rs that extends in the Y direction, and a second casing 4Rc that rotatably supports the second rotation shaft 4Rs. The second rotation shaft 4Rs passes through the second casing 4Rc, and is configured rotatably about the rotational axis AL1 in a third rotation direction R3 and a fourth rotation direction R4 opposite to the third rotation direction R3. Further, the second rotation shaft 4Rs includes a third projection portion 4Ra that protrudes from one side of the second casing 4Rc in the Y direction, and a fourth projection portion 4Rb that protrudes from the other side the second casing 4Rc. The third projection portion 4Ra serving as a third end portion is disposed on one side of the second rotation shaft 4Rs in the Y direction, and the fourth projection portion 4Rb serving as a fourth end portion is disposed on the other side of the second rotation shaft 4Rs in the Y direction.

The first drive transmission portion 5L1 and the second drive transmission portion 5L2 are respectively attached to the first projection portion 4La and the second projection portion 4Lb of the first dual shaft motor 4L. The first drive transmission portion 5L1 includes, as illustrated in FIG. 7, a first clutch portion 5*d*L1, and a first eccentric shaft 5*e*L1 disposed on an output member 5*c* of the first clutch portion 5*d*L1. The first clutch portion 5*d*L1 includes an input member 5*a* to which drive from the first projection portion 4La is entered, the output member 5*c*, and a clutch member 5*b* disposed between the input member 5*a* and the output member 5*c*. The clutch member 5*b* is driven to rotate following the rotation of the input member 5*a* that rotates together with the first projection portion 4La. The clutch member 5*b* transmits drive to or disconnects the same from the output member 5*c*.

The clutch member 5*b* has a saw-toothed surface, and transmits drive to the output member 5*c* only when the first rotation shaft 4Ls of the first dual shaft motor 4L rotates in the first rotation direction R1. That is, the first clutch portion 5*d*L1 is set to be in a transmission state when the first rotation shaft 4Ls rotates in the first rotation direction R1, and set to be in a non-transmission state where drive is not transmitted when the first rotation shaft 4Ls rotates in the second rotation direction R2.

The first eccentric shaft 5*e*L1 disposed on the output member 5*c* is provided eccentrically with respect to the first rotation shaft 4Ls, and rotates integrally with the output member 5*c* that rotates about the first rotation shaft 4Ls. The first eccentric shaft 5*e*L1 is connected to the first pump 3L1, and by the first eccentric shaft 5*e*L1 rotating in the first rotation direction R1 about the first rotation shaft 4Ls, the first pump 3L1 operates. By the operation of the first pump 3L1, air is discharged through a first discharge portion 35L1 of the first pump 3L1. The first pipe 6L1 is connected to the first discharge portion 35L1, as illustrated in FIG. 6, and air discharged through the first discharge portion 35L1 is passed through the first pipe 6L1 and sent toward the toner cartridge 430K.

Similarly, the second drive transmission portion 5L2 includes, as illustrated in FIGS. 6 and 7, a second clutch portion, and a second eccentric shaft 5*e*L2 disposed on an output member of the second clutch portion. The second clutch portion has a similar configuration as the first clutch portion 5*d*L1, and it is arranged symmetrically in the Y direction with respect to the first casing 4Lc from the first clutch portion 5*d*L1.

The second eccentric shaft 5*e*L2 disposed on the output member of the second clutch portion is provided eccentrically with respect to the first rotation shaft 4Ls, and rotates integrally with the output member that rotates about the first rotation shaft 4Ls. The second eccentric shaft 5*e*L2 is connected to the second pump 3L2, and by the second eccentric shaft 5*e*L2 rotating in the second rotation direction R2 about the first rotation shaft 4Ls, the second pump 3L2 operates. By the operation of the second pump 3L2, air is discharged through a second discharge portion 35L2 of the second pump 3L2. The second pipe 6L2 is connected to the second discharge portion 35L2, as illustrated in FIG. 6, and air discharged through the second discharge portion 35L2 is passed through the second pipe 6L2 and sent toward the toner cartridge 430C.

The third drive transmission portion 5R1 and the fourth drive transmission portion 5R2 are respectively attached to the third projection portion 4Ra and the fourth projection portion 4Rb of the second dual shaft motor 4R. The third drive transmission portion 5R1 includes, as illustrated in FIGS. 6 and 7, a third clutch portion, and a third eccentric shaft 5*e*R1 disposed on an output member of the third clutch portion. The third clutch portion adopts a similar configuration as the first clutch portion 5*d*L1.

The third eccentric shaft 5*e*R1 disposed on the output member of the third clutch portion is provided eccentrically with respect to the second rotation shaft 4Rs, and rotates integrally with the output member that rotates about the second rotation shaft 4Rs. The third eccentric shaft 5*e*R1 is connected to the third pump 3R1, and by the third eccentric shaft 5*e*R1 rotating in the third rotation direction R3 about the second rotation shaft 4Rs, the third pump 3R1 operates. By the operation of the third pump 3R1, air is discharged through a third discharge portion 35R1 of the third pump 3R1. The third pipe 6R1 is connected to the third discharge portion 35R1, as illustrated in FIG. 6, and air discharged through the third discharge portion 35R1 is passed through the third pipe 6R1 and sent toward the toner cartridge 430M.

Similarly, the fourth drive transmission portion 5R2 includes, as illustrated in FIGS. 6 and 7, a fourth clutch portion, and a fourth eccentric shaft 5*e*R2 disposed on an output member of the fourth clutch portion. The fourth clutch portion has a similar configuration as the first clutch portion 5*d*L1, and it is arranged symmetrically in the Y direction with respect to the second casing 4Rc from the third clutch portion.

The fourth eccentric shaft 5*e*R2 disposed on the output member of the fourth clutch portion is provided eccentrically with respect to the second rotation shaft 4Rs, and rotates integrally with the output member that rotates about the second rotation shaft 4Rs. The fourth eccentric shaft 5*e*R2 is connected to the fourth pump 3R2, and by the fourth eccentric shaft 5*e*R2 rotating in the fourth rotation direction R4 about the second rotation shaft 4Rs, the fourth pump 3R2 operates. By the operation of the fourth pump 3R2, air is discharged through a fourth discharge portion 35R2 of the fourth pump 3R2. The fourth pipe 6R2 is connected to the fourth discharge portion 35R2, as illustrated in FIG. 6, and air discharged through the fourth discharge portion 35R2 is passed through the fourth pipe 6R2 and sent toward the toner cartridge 430Y.

As described above, the respective cutch portions adopt similar configurations, and the clutch portions may be transitioned between a transmission state and a non-transmission state according to the rotation direction of the first rotation shaft 4Ls and the rotation direction of the second rotation shaft 4Rs.

That is, when the first rotation shaft 4Ls of the first dual shaft motor 4L rotates in the first rotation direction R1, the first clutch portion 5*d*L1 will be in a transmission state and the second clutch portion will be in a non-transmission state. Therefore, the first pump 3L1 will be driven by being transmitted a first driving force from a first projection portion 4La of the first rotation shaft 4Ls and the second pump 3L2 will not be driven. Further, when the first rotation shaft 4Ls of the first dual shaft motor 4L rotates in the second rotation direction R2, the first clutch portion 5*d*L1 will be in a non-transmission state and the second clutch portion will be in a transmission state. Therefore, the first pump 3L1 will not be driven and the second pump 3L2 will be driven by being transmitted a second driving force from the second projection portion 4Ra of the first rotation shaft 4Ls.

Further, when a second rotation shaft 4Rs of a second dual shaft motor 4R rotates in the third rotation direction R3, the third clutch portion will be in a transmission state and the fourth clutch portion will be in a non-transmission state. Therefore, the third pump 3R1 will be driven and the fourth pump 3R2 will not be driven. Further, as described above, when the second rotation shaft 4Rs of the second dual shaft motor 4R rotates in the fourth rotation direction R4, the third clutch portion will be in a non-transmission state and the fourth clutch portion will be in a transmission state. Therefore, the third pump 3R1 will not be driven and the fourth pump 3R2 will be driven.

Transmission states of the first clutch portion 5*d*L1, the second clutch portion, the third clutch portion, and the fourth clutch portion may also be referred to respectively as a first transmission state, a second transmission state, a third transmission state, and a fourth transmission state. The states of the first drive transmission portion 5L1, the second drive transmission portion 5L2, the third drive transmission portion 5R1, and the fourth drive transmission portion 5R2 at this time may also be referred to respectively as the first transmission state, the second transmission state, the third transmission state, and the fourth transmission state.

The non-transmission states of the first clutch portion 5*d*L1, the second clutch portion, the third clutch portion, and the fourth clutch portion may also be referred to respectively as a first non-transmission state, a second non-transmission state, a third non-transmission state, and a fourth non-transmission state. Further, the states of the first drive transmission portion 5L1, the second drive transmission portion 5L2, the third drive transmission portion 5R1, and the fourth drive transmission portion 5R2 at this time may also be referred to respectively as the first non-transmission state, the second non-transmission state, the third non-transmission state, and the fourth non-transmission state.

The configurations of the respective clutch portions described above are mere examples, and the present technique is not limited thereto. That is, the clutch portion may adopt other configurations as long as the cutoff or transmission of drive to the output shaft is varied according to the rotation direction of the rotation shaft.

Detailed Configuration of Pump

Next, detailed configurations of the respective pumps will be described with reference to FIG. 7. The respective pumps adopt similar configurations as described above, such that in the following description, the first pump 3L1 is taken as an example and illustrated. As illustrated in FIG. 7, the first pump 3L1 includes a base member 36L1 fixed to the attachment member 37, and a diaphragm member 31L1 nipped by the attachment member 37 and the base member 36L1. The base member 36L1 includes an intake portion 34 through which air is taken in, a discharge portion 35L1 through which air is discharged, and a hole portion not shown.

The diaphragm member 31L1 includes a flat surface portion 31*b*, and a pillar portion 31*b*L1 that extends in the Z direction from the flat surface portion 31*b*. When the base member 36L1 and the diaphragm member 31L1 are attached to the attachment member 37, the pillar portion 31*b*L1 of the diaphragm member 31L1 passes through the hole portion of the base member 36L1. A suction valve 31*c* and an exhaust valve 31*d* are disposed on the flat surface portion 31*b*. A shaft hole portion 31*a*L1 to which the first eccentric shaft 5*e*L1 is inserted via a bearing 32 is disposed on the pillar portion 31*b*L1. In other words, the first eccentric shaft 5*e*L1 is supported rotatably in the shaft hole portion 31*a*L1 via the bearing 32.

A recess portion 37*a* is disposed on the attachment member 37 at a position corresponding to the flat surface portion 31*b* of the diaphragm member 31L1. In a state where the diaphragm member 31L1 and the base member 36L1 are attached to the attachment member 37, a volume variation portion 33L1 is formed by the recess portion 37*a* of the attachment member 37 and the flat surface portion 31*b* of the diaphragm member 31L1. The volume variation portion 33L1 is a space surrounded by the recess portion 37*a* and the flat surface portion 31*b*, and the first pump 3L1 is a diaphragm-type pump capable of varying the capacity of the volume variation portion 33L1, which is the internal space of the first pump 3L1. The capacity of the volume variation portion 33L1 repeatedly increases and decreases by the diaphragm member 31L1 being moved in response to the rotation of the first eccentric shaft 5*e*L1. Thereby, the first pump 3L1 functions as a diaphragm-type pump that takes in air through the intake portion 34 and discharges air through the discharge portion 35L1.

The second pump 3L2, the third pump 3R1, and the fourth pump 3R2 adopt a similar configuration as the first pump 3L1, and may send out air by the rotation of the respective eccentric shafts. As described, the pump unit 1 may operate arbitrary pumps (3L1, 3L2, 3R1, and 3R2) by switching the rotation directions of the rotation shafts (4Ls and 4Rs) of the two motors, which are the first dual shaft motor 4L and the second dual shaft motor 4R.

Configuration of Toner Cartridge

Figure 8B:
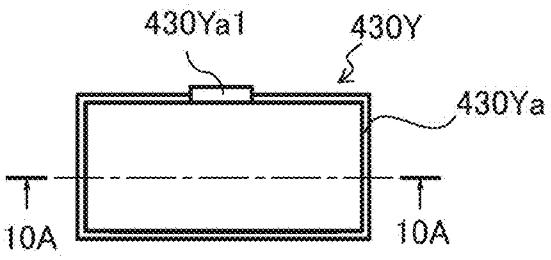
FIG. 8B is a plan view of the toner cartridge.
Figure 8A:
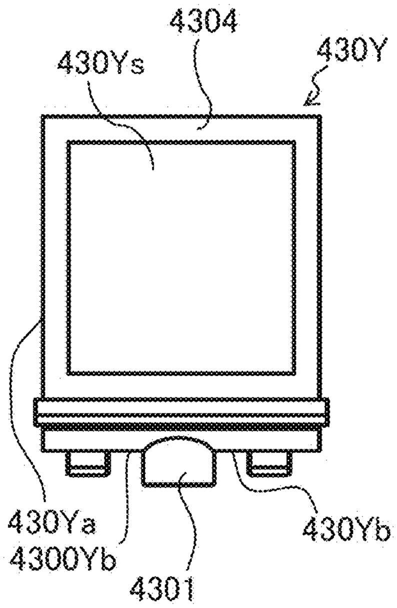
FIG. 8A is a front view of the toner cartridge.
Figure 8D:
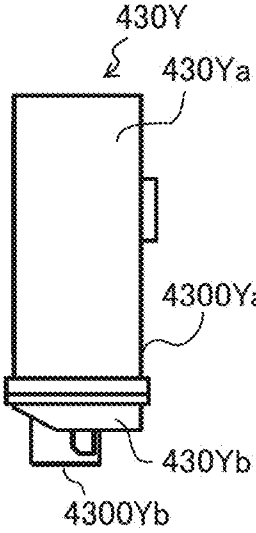
FIG. 8D is a side view of the toner cartridge.
Figure 8E:
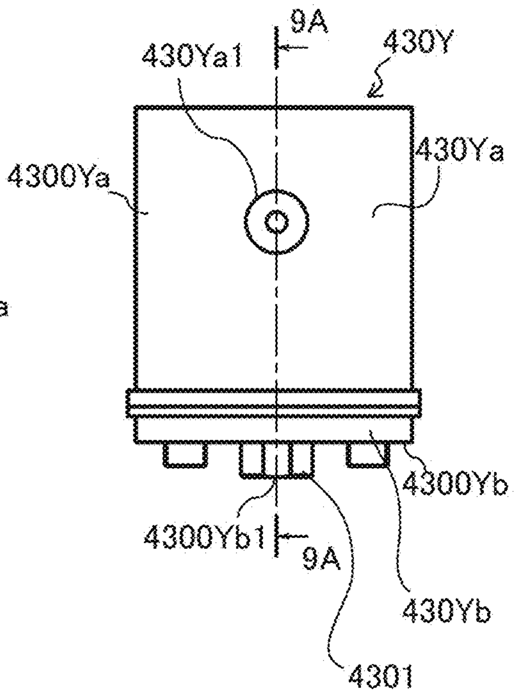
FIG. 8E is a rear view of the toner cartridge.
Figure 8C:
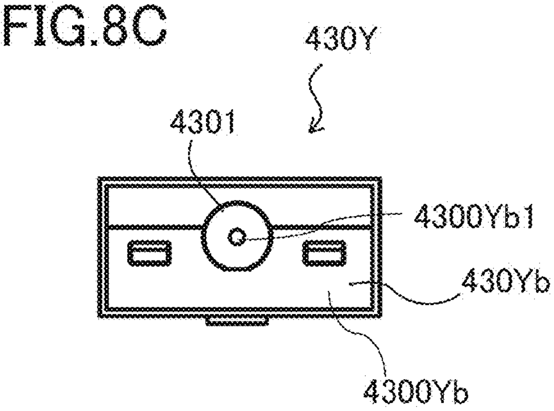
FIG. 8C is a bottom view of the toner cartridge.
Figure 9A:
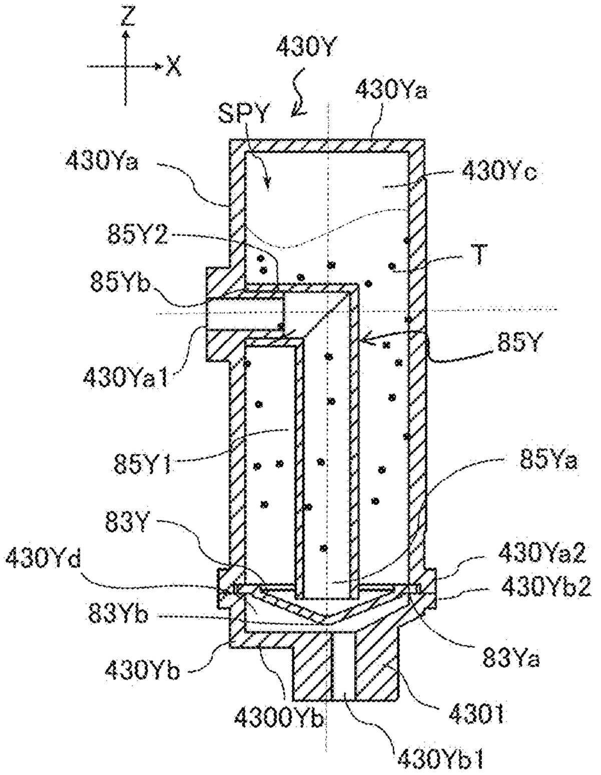
FIG. 9A is a cross-sectional view taken at a 9A-9A cross-section of FIG. 8E.
Figure 9B:
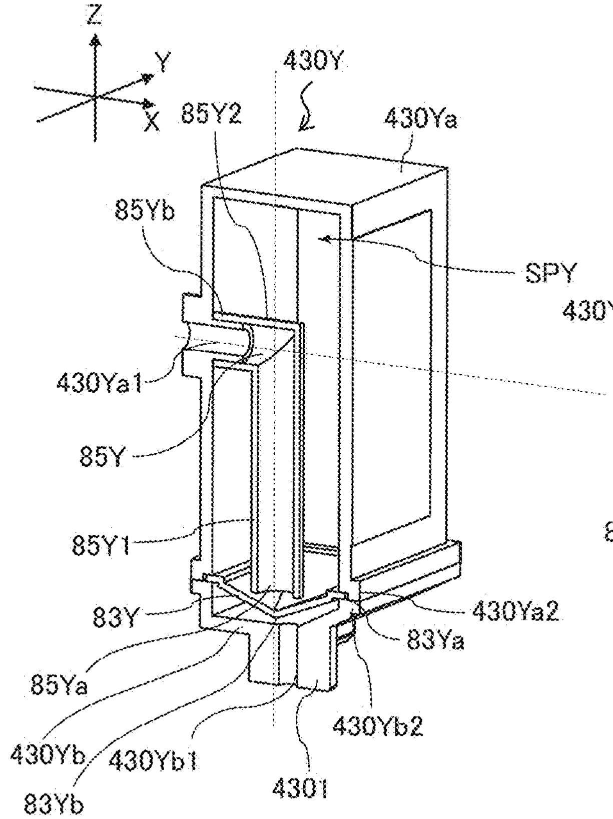
FIG. 9B is a perspective view of the toner cartridge cut at an XZ plane.
Figure 9C:
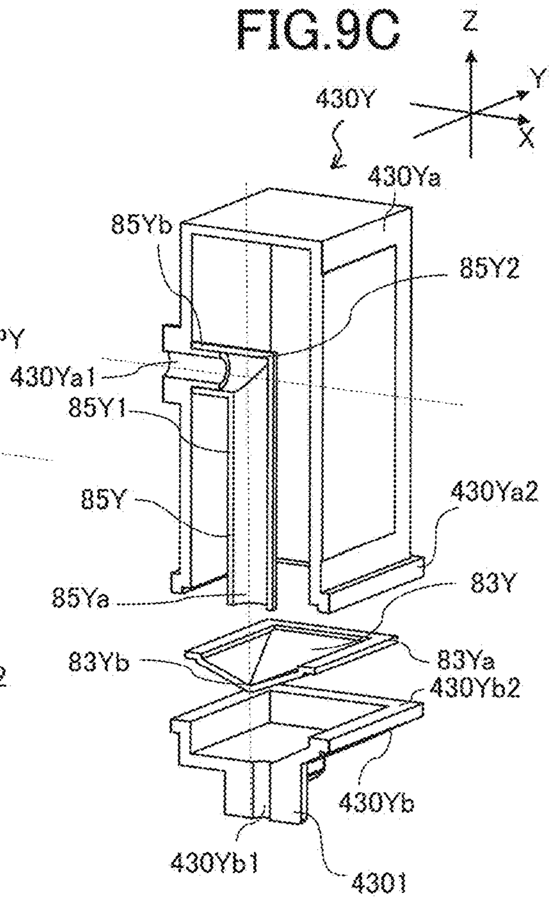
FIG. 9C is an exploded view illustrating the toner cartridge cut at the XZ plane.
Figure 10A:
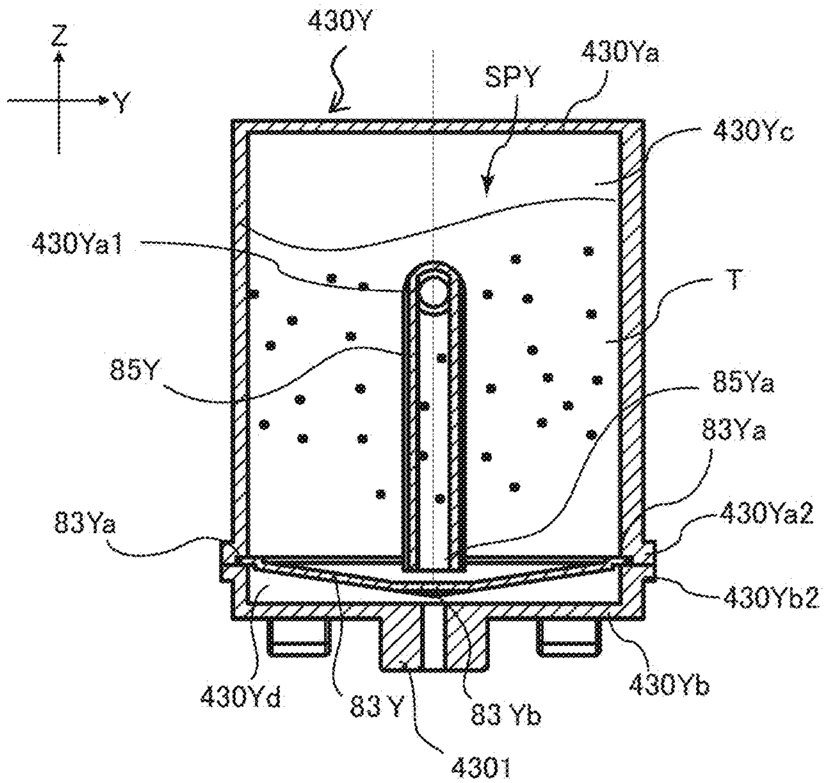
FIG. 10A is a cross-sectional view taken at a 10A-10A cross-section of FIG. 8B.
Figure 10B:
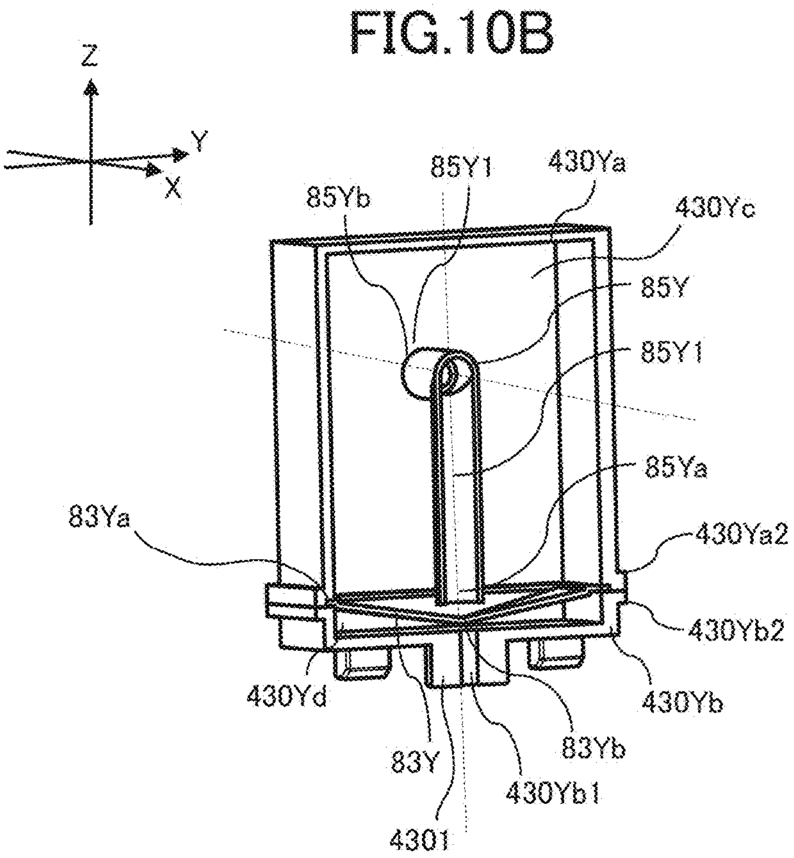
FIG. 10B is a perspective view of the toner cartridge cut at a YZ plane.

Next, the general configuration of the toner cartridge 430Y will be described with reference to FIGS. 8A to 10B. FIG. 8A is a front view of the toner cartridge 430Y, and FIG. 8B is a plan view of the toner cartridge 430Y. FIG. 8C is a bottom view of the toner cartridge 430Y, FIG. 8D is a side view of the toner cartridge 430Y, and FIG. 8E is a rear view of the toner cartridge 430Y. FIG. 9A is a cross-sectional view of a 9A-9A cross-section of FIG. 8E, and FIG. 9B is a perspective view of the toner cartridge 430Y cut at an XZ plane. FIG. 9C is an exploded view of the toner cartridge 430Y cut at an XZ plane. FIG. 10A is a cross-sectional view of a 10A-10A cross-section of FIG. 8B, and FIG. 10B is a perspective view of the toner cartridge 430Y cut at a YZ plane.

The toner cartridge 430K has a width La in the Y direction, as illustrated in FIG. 3A, and the width La is wider than each width Lb1 of the toner cartridges 430Y, 430M, and 430C. Therefore, a capacity of the toner cartridge 430K for accommodating toner is greater than the capacities of the respective toner cartridges 430Y, 430M, and 430C. Generally, a consumption amount of black toner is greater than that of other color toners, and as described above, the toner cartridge 430K may accommodate more toner than the other toner cartridges 430Y, 430M, and 430C. Therefore, the number of times of replacement of the toner cartridges 430Y, 430M, 430C, and 430K may be equalized, and the usability may be improved.

The toner cartridges 430Y, 430M, 430C, and 430K have similar configurations except for the widths in the Y direction, such that only the toner cartridge 430Y will be described below, and the descriptions of the toner cartridges 430M, 430C, and 430K will be omitted. The following descriptions related to the toner cartridge 430Y are based on a position in which the toner cartridge 430Y is attached to the cartridge holder 51.

The toner cartridge 430Y includes, as illustrated in FIGS. 8A to 10B, a first frame body 430Ya, a second frame body 430Yb, a filter 83Y, and an air discharge duct 85Y. According to the present embodiment, the first frame body 430Ya and the second frame body 430Yb are composed of a resin material, but they may also be formed of paper or rubber. The filter 83Y is formed in a sheet shape, and fixed in a manner nipped between the first frame body 430Ya and the second frame body 430Yb.

An inner space SPY of the toner cartridge 430Y is partitioned by the filter 83Y into a toner accommodation chamber 430Yc and an air chamber 430Yd. That is, the toner accommodation chamber 430Yc is composed of the first frame body 430Ya and the filter 83Y, and the air chamber 430Yd is composed of the second frame body 430Yb and the filter 83Y. The air chamber 430Yd is arranged below the filter 83Y, and the toner accommodation chamber 430Yc is arranged above the filter 83Y.

The toner accommodation chamber 430Yc is configured to accommodate toner T (refer to FIG. 9A), and toner T is supported in a gravity direction, i.e., −Z direction, by the filter 83Y within the toner accommodation chamber 430Yc. Toner T is not accommodated in the air chamber 430Yd. The filter 83Y is composed, for example, of a porous member formed of resin fiber. The pores of the filter 83Y are designed to have a size and density that allows air to pass through but regulates toner T from passing through. That is, the filter 83Y is configured to allow passing of air and prevent passing of toner T.

A flange portion 430Ya2 that extends along an XY plane is formed at a lower end portion of the first frame body 430Ya, and a flange portion 430Yb3 that extends along the XY plane is formed on an upper end portion of the second frame body 430Yb. The first frame body 430Ya and the second frame body 430Yb are joined by ultrasonic welding of the flange portions 430Ya2 and 430Yb3, and an outer edge portion 83Ya of the filter 83Y is nipped between the first frame body 430Ya and the second frame body 430Yb. The flange portions 430Ya2 and 430Yb3 may be mutually fixed to each other, not only through ultrasonic welding, but through heat sealing, adhesive agents such as double-sided tape or hot melt, or by screws.

The filter 83Y is inclined from the outer edge portion 83Ya toward a lowermost portion 83Yb positioned below the outer edge portion 83Ya. That is, the filter 83Y includes an inclined portion that is disposed downward toward, that is, as it approximates, the lowermost portion 83Yb in the X direction or the Y direction or the horizontal direction. The lowermost portion 83Yb is a portion that is protruded with respect to the outer edge portion 83Ya in a direction from the toner accommodation chamber 430Yc toward the air chamber 430Yd. The lowermost portion 83Yb is disposed at a center portion of the filter 83Y in the X direction and the Y direction, as illustrated in FIGS. 9A and 10B.

As illustrated in FIG. 8E, a discharge port 430Ya1 through which toner in the toner accommodation chamber 430Yc is discharged to the exterior of the toner cartridge 430Y is disposed on a rear surface 4300Ya of the first frame body 430Ya. The discharge port 430Ya1 is composed of a through hole that passes through the first frame body 430Ya in the X direction.

As illustrated in FIGS. 8A, 8C, and 8E, a projected portion 4301 is disposed to protrude downward on a bottom surface 4300Yb of the second frame body 430Yb. The intake port 430Yb1 composed of a through port that passes through the second frame body 430Yb in the Z direction is disposed on the projected portion 4301. The discharge port 430Ya1 and the intake port 430Yb1 are communicated with the exterior of the toner cartridge 430Y.

The discharge port 430Ya1 and the intake port 430Yb1 are preferably disposed on sides constituting the toner cartridge 430Y excluding the right and left sides thereof. In other words, the discharge port 430Ya1 and the intake port 430Yb1 are preferably disposed on the side surfaces of the toner cartridge 430Y excluding the side facing the Y direction, which is the direction along which the toner cartridges 430Y, 430M, 430C, and 430K are aligned. Thereby, as illustrated in FIG. 3A, gaps Gym, Gmc, and Gck formed between the respective toner cartridges 430Y, 430M, 430C, and 430K in the Y direction may be made narrow. As a result, the widths of the toner cartridges 430Y, 430M, 430C, and 430K in the Y direction may be widened, and the capacity of toner capable of being accommodated in the toner cartridges 430Y, 430M, 430C, and 430K may be increased.

The gap Gym is the gap formed between the toner cartridge 430Y and the toner cartridge 430M in the Y direction. The gap Gmc is the gap formed between the toner cartridge 430M and the toner cartridge 430C in the Y direction. The gap Gck is the gap formed between the toner cartridge 430C and the toner cartridge 430K in the Y direction.

As illustrated in FIG. 3A, a positioning portion 51*b* that fits to the projected portion 4301 is disposed on the cartridge holder 51. In the present embodiment, the positioning portion 51*b* is a recess portion formed on the cartridge holder 51, and on the bottom surface of the positioning portion 51*b* is formed the discharge hole 514*a* through which air sent from the pump unit 1 is discharged. The toner cartridge 430Y is positioned with respect to the cartridge holder 51 by having the projected portion 4301 fit to the positioning portion 51*b*. In this state, the intake port 430Yb1 disposed on the projected portion 4301 of the toner cartridge 430Y is communicated with the fourth pipe 6R2 of a pump unit 80Y.

The discharge port 430Ya1 formed on the first frame body 430Ya of the toner cartridge 430Y is opened toward an upstream direction in the X direction. That is, the discharge port 430Ya1 is opened toward a same direction as an attachment direction of the toner cartridge 430Y to the cartridge holder 51. Therefore, when attaching the toner cartridge 430Y to the cartridge holder 51 facing the upstream side in the X direction, the discharge port 430Ya1 may be easily fit to communicate with an inlet port 51*a*Y of the cartridge holder 51.

Regardless of the arrangement described above, the discharge port 430Ya1 may be disposed on the bottom surface 4300Yb or the upper surface of the toner cartridge 430Y, and the intake port 430Yb1 may be disposed on the rear surface 4300Ya or the upper surface of the toner cartridge 430Y. Further, if there is enough space within the apparatus body 72, the discharge port 430Ya1 and the intake port 430Yb1 may be disposed on both right and left sides among the respective sides of the toner cartridge 430Y.

Further, the toner cartridge 430Y may be provided with a sealing member not shown for sealing the discharge port 430Ya1. The sealing member is composed of a seal or a shutter. In a state where the toner cartridge 430Y is not attached to the cartridge holder 51, the sealing member may seal the discharge port 430Ya1 to prevent toner within the toner accommodation chamber 430Yc from leaking to the exterior of the toner cartridge 430Y. In a state where sealing member is composed of a seal, the sealing member will be removed from the rear surface 4300Ya of the toner cartridge 430Y when attaching the toner cartridge 430Y to the cartridge holder 51. In a state where the sealing member is composed of a shutter, the sealing member will be moved with respect to the rear surface 4300Ya of the toner cartridge 430Y to open the discharge port 430Ya1 when attaching the toner cartridge 430Y to the cartridge holder 51.

Further, as illustrated in FIG. 8A, a label 430Ys is provided on a front side 4304 of the toner cartridge 430Y. The label 430Ys is provided to indicate the color of toner accommodated in the toner cartridge 430Y. The label 430Ys is not shown in drawings other than FIG. 8A. The label 430Ys may also indicate the method for attaching the toner cartridge 430Y to the cartridge holder 51 or information related to the toner cartridge 430Y. For example, the label 430Ys may indicate the capacity of toner that the toner cartridge 430Y may accommodate, the expiration date for use of the toner, the method for storing the toner cartridge 430Y, and the method for removing the sealing member described above.

As illustrated in FIGS. 9A to 10B, the air discharge duct 85Y is arranged on the inner side of the toner accommodation chamber 430Yc. The air discharge duct 85Y includes an inlet 85Ya that opens downward in the gravity direction, and an outlet 85Yb that opens rearward, that is, upstream in the X direction, and communicates with the discharge port 430Ya1 of the toner cartridge 430Y to be opened to the exterior of the toner cartridge 430Y. The outlet 85Yb is positioned upward than the inlet 85Ya. The air discharge duct 85Y includes a first pipe portion 85Y1 to which the inlet 85Ya is provided and that extends in the Z direction, and a second pipe portion 85Y2 to which the outlet 85Yb connected to the discharge port 430Ya1 is provided and that extends in the X direction, wherein the air discharge duct 85Y is bent in midway. As described, the air discharge duct 85Y connects the inlet 85Ya and the outlet 85Yb. The inlet 85Ya is arranged to face the lowermost portion 83Yb of the filter 83Y with a gap formed therebetween in the gravity direction. The inlet 85Ya is preferably positioned adjacent to the filter 83Y. The air discharge duct 85Y according to the present embodiment is composed of a resin material, but it may also be composed of paper or rubber.

Toner Conveyance Mechanism

Next, a mechanism by which toner accommodated in the toner accommodation chamber 430Yc of the toner cartridge 430Y is conveyed to the developing container 43Y of the process cartridge PY will be described. As illustrated in FIGS. 3B and 6, by the operation of the fourth pump 3R2 of the pump unit 1, air is discharged through the discharge hole 514*a* via the flow path of the fourth pipe 6R2 and the cartridge holder 51. Air discharged upward through the discharge hole 514*a* is taken into the air chamber 430Yd through the intake port 430Yb1 of the toner cartridge 430Y, as illustrated in FIG. 9A. The air is filled in the air chamber 430Yd, and passes through the filter 83Y into the toner accommodation chamber 430Yc.

The air flowing into the toner accommodation chamber 430Yc enters the space between particles of toner T and fluidifies the toner T. The interior of the toner cartridge 430Y is set to positive pressure by air flowing in from the pump unit 80Y, and the air attempts to exit via the air discharge duct 85Y through the discharge port 430Ya1 to the exterior of the toner cartridge 430Y. In this state, toner T within the toner accommodation chamber 430Yc is caused to move within the air discharge duct 85Y together with air, and is discharged to the exterior of the toner cartridge 430Y through the discharge port 430Ya1. That is, the air discharge duct 85Y guides the toner within the toner accommodation chamber 430Yc together with air through the inlet 85Ya to the discharge port 430Ya1.

Toner T discharged through the discharge port 430Ya1 is passed through the inlet port 51*a*Y of the cartridge holder 51 and enters an upstream end portion 62Yu of the supply pipe 62Y. Then, toner T is conveyed within the supply piper 62Y by the air that has flown into the supply pipe 62Y together with toner T, and supplied through a downstream end portion 62Yd of the supply pipe 62Y into the developing container 43Y of the process cartridge PY.

Steering members SY1 and SY2 for steering toner within the developing container 43Y is disposed rotatably in the interior of the developing container 43Y, as illustrated in FIG. 5B. Similarly, steering members SM1 and SM2, steering members SC1 and SC2, and steering members SK1 and SK2 are disposed respectively in the interior of the developing containers 43M, 43C, and 43K.

Toner within the developing container 43Y is leveled by the rotation of the steering members SY1 and SY2, and conveyed in the Y direction. According to the present embodiment, the supply pipes 62Y, 62M, 62C, and 62K are respectively connected to the center portion in the Y direction of the developing units 9Y, 9M, 9C, and 9K, in other words, the developing containers 43Y, 43M, 43C, and 43K. Thereby, the time required for leveling the toner agent surface of respective colors by the rotation of the steering members SY1 and SY2 will not be dispersed in the respective developing units 9Y, 9M, 9C, and 9K corresponding to the four color toners. In the present embodiment, the steering members are composed of a rotation shaft and a sheet member fixed to the rotation shaft, but the present technique is not limited thereto. For example, the steering member may be composed of a screw that is configured to convey the toner within the developing container along the Y direction.

Not only toner T but also air flows into the developing container 43Y, such that the internal pressure within the developing container 43Y increases. Therefore, according to the present embodiment, as illustrated in FIGS. 3A and 4B, a through hole (not shown) is formed on the upper surface of the developing container 43Y, and the through hole is covered with an air filter PfY. The air filter PfY is formed of nonwoven fabric, which allows air to pass through but regulates the passing of toner. Thereby, toner flowing into the developing container 43Y is restricted by the air filter PfY from being discharged to the exterior, and remains inside the developing container 43Y. Meanwhile, at least a portion of air flowing into the developing container 43Y is passed through the air filter PfY and discharged to the exterior of the developing container 43Y. Thereby, the increase of internal pressure of the developing container 43Y is suppressed, and supply of toner to the developing container 43Y may be realized smoothly.

Similarly, air filters PfM, PfC, and PfK and through holes not shown covered by the air filters PfM, PfC, and PfK are provided on the upper surfaces of the developing containers 43M, 43C, and 43K.

The number of air filters and through holes are not limited to one, and multiple filters and through holes may be provided on the developing container 43Y. By providing multiple air filters and through holes on one developing container, the increase of internal pressure within the developing container may be suppressed efficiently.

As described above, toner accommodated in the toner cartridge 430Y is conveyed together with air to the developing container 43Y and supplied to the developing container 43Y. In a configuration where the direction of the conveyance path is changed in midway or if the conveyance paths differ according to toner color, as according to the supply pipes 62Y, 62M, 62C, and 62K of the present embodiment, it is preferable to convey toner using air. By conveying toner using air, the degree of freedom of design of the toner conveyance path is improved, and members such as screws for conveying toner become unnecessary, such that the number of necessary components may be reduced and costs may be cut down.

By providing the air chamber 430Yd, which is a space having high sealability, between the discharge hole 514*a* and the filter 83Y as according to the present embodiment, the air discharged through the discharge hole 514*a* will head efficiently to the filter 83Y without being dispersed to the exterior of the toner cartridge 430Y. For example, in a situation where the toner T within the toner accommodation chamber 430Yc is aggregated, such as when vibration is applied to the toner cartridge 430Y or when it has been left for a long period of time, the pressure necessary to allow air to flow into the toner accommodation chamber 430Yc through the filter 83Y becomes high. Even according to this case, by continuously sending air from the pump unit 1 to the air chamber 430Yd and increasing the air, i.e., air pressure, within the air chamber 430Yd, air may be sent into the toner accommodation chamber 430Yc through the filter 83Y.

Further, since the air chamber 430Yd is provided, the pump unit 1 is merely required to exert a performance of creating a pressure to send air continuously into the air chamber 430Yd until a necessary pressure is realized to allow air to pass through the filter 83Y into the toner accommodation chamber 430Yc. Since there are no special requirements regarding the discharge speed or discharge amount of air, it becomes necessary to adopt a small pump unit, such that the downsizing of the apparatus s realized.

Pump Unit Layout

Next, a layout of the pump unit 1 will be described in detail. As illustrated in FIGS. 6 and 7, the first rotation shaft 4Ls of the first dual shaft motor 4L and the second rotation shaft 4Rs of the second dual shaft motor 4R are arranged coaxially. That is, the first rotation shaft 4Ls and the second rotation shaft 4Rs are arranged on the same rotational axis AL1 as illustrated in FIG. 1. Therefore, the size of the pump unit 1 in the X direction and the Z direction may be downsized.

The first dual shaft motor 4L, the first pump 3L1, the first drive transmission portion 5L1, the second drive transmission portion 5L2, and the second pump 3L2 are aligned in the Y direction. Similarly, the second dual shaft motor 4R, the third pump 3R1, the third drive transmission portion 5R1, the fourth drive transmission portion 5R2, and the fourth pump 3R2 are aligned in the Y direction. Further, the first pump 3L1, the second pump 3L2, the third pump 3R1, and the fourth pump 3R2 are aligned in the Y direction serving as the first direction. Therefore, the size of the pump unit 1 in the X direction and the Z direction may be downsized.

As described above, by downsizing the pump unit 1 in the X direction and the Z direction, the pump unit 1 may be arranged between a laser light LC exposing the photosensitive drum 44C and a laser light LK exposing the photosensitive drum 44K in the X direction, as illustrated in FIG. 1. The laser light LC is one example of a second light path for exposing the photosensitive drum 44C, and the laser light LK is one example of a first light path for exposing the photosensitive drum 44K. Further, the pump unit 1 may be arranged between the laser scanner LB and the developing unit 9K in the Z direction, which serves as a third direction perpendicular to both the X direction and the Y direction. Especially, as illustrated in FIG. 5B, in a case where the developing units 9Y, 9M, 9C, and 9K are arranged in a manner separating in the Z direction from the laser scanner LB along the X direction, a space is formed between the laser scanner LB and the developing unit 9K. By arranging the pump unit 1 in this space, space efficiency of the image forming apparatus 100 may be improved.

The pump unit 1 is arranged at a position farther from the fixing unit 21 than the developing units 9Y, 9M, and 9C are from the fixing unit 21 in the X direction. Further, the developing unit 9Y is arranged closer to the fixing unit 21 than the developing units 9M, 9C, and 9K are to the fixing unit 21 in the X direction, and the developing unit 9M is arranged closer to the fixing unit 21 than the developing units 9C and 9K in the X direction. Further, the developing unit 9C is arranged closer to the fixing unit 21 than the developing unit 9K in the X direction. The fixing unit 21 generates heat in the process of performing a fixing operation of fixing the toner image on a sheet. Therefore, by arranging the pump unit 1 at a position distant from the fixing unit 21, the rising of temperature of the first dual shaft motor 4L and the second dual shaft motor 4R of the pump unit 1 may be suppressed. Further, air flow may be created in the image forming unit 500 by the pump unit 1, and temperature of air around the image forming unit 500 may be reduced.

The intake ports (430Yb1) of the respective cartridges through which air sent from the respective pumps are taken in are also arranged in an aligned manner in the Y direction. Therefore, the path of air from the respective pumps, such as the first pump 3L1, to the respective intake ports, such as 430Yb1, may be shortened, such that the conveyance efficiency of air may be improved, and occupation area of the pump unit 1 and the toner cartridges 430Y, 430M, 430C, and 430K may be reduced.

Further, as described above, the first pump 3L1 and the second pump 3L2 may be driven selectively by the first dual shaft motor 4L, which is one of the driving sources. Similarly, the third pump 3R1 and the fourth pump 3R2 may be driven selectively by the second dual shaft motor 4R, which is one of the driving sources. Therefore, the number of driving sources of the pump unit 1 may be reduced, by which space may be saved and costs may be cut down.

As illustrated in FIGS. 1 and 5B, when viewed in the Y direction, the developing units 9Y, 9M, 9C, and 9K and the toner cartridges 430Y, 430M, 430C, and 430K are arranged to be overlapped with the virtual line VL1 extending in the X direction. The pump unit 1 is arranged above the virtual line VL1. Further, the toner cartridges 430Y, 430M, 430C, and 430K are disposed closer to the developing unit 9K than to the developing units 9Y, 9M, and 9C in the X direction, and the pump unit 1 is disposed so as to be overlapped with the developing unit 9K when viewed in the Z direction. Thereby, the pump unit 1 may be arranged close to the toner cartridges 430Y, 430M, 430C, and 430K and the developing unit 9K. Thereby, pressure loss when sending air between the pump unit 1 and the toner cartridges 430Y, 430M, 430C, and 430K may be reduced, and the pump unit 1 and the image forming unit 500 may be downsized.

By adopting the arrangement of the pump unit 1 and the circumference configurations as described above, a new embodiment of the image forming apparatus including the pump unit 1 may be offered. Further, the pump unit 1 and the image forming apparatus 100 may be downsized.

Other Embodiments

According to the present embodiment, the first pump 3L1 is operated when the first rotation shaft 4Ls is rotated in the first rotation direction R1, but the present technique is not limited thereto. Which pump is to be operated when the first rotation shaft 4Ls or the second rotation shaft 4Rs is rotated in the respective directions may be set arbitrarily.

According to the present embodiment, the first dual shaft motor 4L, the first clutch portion 5*d*L1, the first eccentric shaft 5*e*L1, the second clutch portion, and the second eccentric shaft 5*e*L2 are arranged in an aligned manner in the Y direction, but the present technique is not limited thereto. For example, the first dual shaft motor 4L, the first clutch portion 5*d*L1, the first eccentric shaft 5*e*L1, the second clutch portion, and the second eccentric shaft 5*e*L2 may be arranged in an aligned manner in either the X direction or the Z direction.

According to the present embodiment, the first rotation shaft 4Ls of the first dual shaft motor 4L and the second rotation shaft 4Rs of the second dual shaft motor 4R are arranged coaxially, but the present technique is not limited thereto. For example, the first rotation shaft 4Ls and the second rotation shaft 4Rs are not necessarily arranged coaxially, and may be somewhat displaced in the X direction or the Z direction.

The respective pumps described above are not limited to diaphragm-type pumps, and they may be composed of reciprocating pumps, such as piston pumps or plunger pumps. Further, the respective pumps may be composed of non-positive-displacement pumps such as centrifugal pumps, propeller pumps, or viscosity pumps. According to the pump unit 1, the first pump 3L1 and the second pump 3L2 are operated by one first dual shaft motor 4L, but the present technique is not limited thereto. For example, the first pump 3L1 and the second pump 3L2 may be operated not by one driving source but by two driving sources.

Further according to the present embodiment, the pump unit 1 is arranged above the developing unit 9K, but the present technique is not limited thereto. For example, the pump unit 1 may be arranged below the developing unit 9K. In this case, the pump unit 1 may be arranged so as not to overlap with the toner cartridges 430Y, 430M, 430C, and 430 when viewed in the Z direction.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-027892, filed Feb. 27, 2024 which is hereby incorporated by reference herein in its entirety.

What is claimed is:

1. An image forming apparatus configured to form an image on a sheet, comprising:

an apparatus body including:

a first developing unit including a first developing container configured to accommodate a first toner and a first developing roller configured to bear the first toner; and a second developing unit including a second developing container configured to accommodate a second toner and a second developing roller configured to bear the second toner, a first toner container configured to accommodate the first toner and attachably and detachably supported on the apparatus body, the first toner container being configured to supply the first toner together with air toward the first developing container;

a second toner container configured to accommodate the second toner and attachably and detachably supported on the apparatus body, the second toner container being configured to supply the second toner together with air toward the second developing container, the second toner container being aligned in a first direction with the first toner container;

a pump unit including:

a first pump configured to convey air toward the first toner container, and a second pump configured to convey air toward the second toner container, and aligned with the first pump in the first direction; and one driving source configured to drive the first pump and the second pump.

2. The image forming apparatus according to claim 1, wherein the first developing unit and the second developing unit are aligned in a second direction orthogonal to the first direction.

3. The image forming apparatus according to claim 2, wherein the first toner container and the second toner container are disposed, in the second direction, closer to the first developing unit than to the second developing unit, and wherein the pump unit is disposed so as to be overlapped with the first developing unit when viewed in a third direction perpendicular to both the first direction and the second direction.

4. The image forming apparatus according to claim 3, wherein the pump unit is disposed above the first developing unit.

5. The image forming apparatus according to claim 2, wherein the apparatus body includes a fixing unit configured to fix a toner image to the sheet by applying heat and pressure to the toner image, wherein the second developing unit is arranged closer to the fixing unit than the first developing unit is to the fixing unit in the second direction, and wherein the pump unit is arranged farther from the fixing unit than the second developing unit is from the fixing unit in the second direction.

6. The image forming apparatus according to claim 2, wherein, when viewed in the first direction, the first developing unit, the second developing unit, the first toner container, and the second toner container are arranged so as to be overlapped with a virtual line that extends in the second direction, and wherein the pump unit is disposed above the virtual line.

7. The image forming apparatus according to claim 2, wherein the apparatus body includes:

a first photosensitive drum configured to bear an electrostatic latent image to be developed by the first developing roller, a second photosensitive drum configured to bear an electrostatic latent image to be developed by the second developing roller; and an exposure unit configured to expose the first photosensitive drum and the second photosensitive drum, and wherein the pump unit is arranged, in the second direction, between a first light path by which the exposure unit exposes the first photosensitive drum and a second light path by which the exposure unit exposes the second photosensitive drum.

8. The image forming apparatus according to claim 2, wherein the apparatus body includes:

a first photosensitive drum configured to bear an electrostatic latent image developed by the first developing roller, a second photosensitive drum configured to bear an electrostatic latent image developed by the second developing roller; and an exposure unit configured to expose the first photosensitive drum and the second photosensitive drum, and wherein the pump unit is disposed between the exposure unit and the first developing unit in a third direction perpendicular to both the first direction and the second direction.

9. The image forming apparatus according to claim 1, wherein the pump unit includes:

a motor configured to serve as the driving source, the motor including a rotation shaft configured to rotate in a first rotation direction and a second rotation direction opposite to the first rotation direction about a rotational axis, the rotation shaft including a first end portion on one side in a direction of the rotational axis and a second end portion on the other side thereof, a first drive transmission portion configured to be transitioned between a first transmission state in which the first drive transmission portion transmits a first driving force from the first end portion of the rotation shaft to the first pump, and a first non-transmission state in which the first drive transmission portion does not transmit the first driving force from the first end portion to the first pump; and a second drive transmission portion configured to be transitioned between a second transmission state in which the second drive transmission portion transmits a second driving force from the second end portion of the rotation shaft to the second pump, and a second non-transmission state in which the second drive transmission portion does not transmit the second driving force from the second end portion to the second pump, wherein the first drive transmission portion is configured to drive the first pump by being transitioned to the first transmission state when the rotation shaft is rotated in the first rotation direction, and configured not to drive the first pump by being transitioned to the first non-transmission state when the rotation shaft is rotated in the second rotation direction, and wherein the second drive transmission portion is configured not to drive the second pump by being transitioned to the second non-transmission state when the rotation shaft is rotated in the first rotation direction, and configured to drive the second pump by being transitioned to the second transmission state when the rotation shaft is rotated in the second rotation direction.

10. The image forming apparatus according to claim 9, wherein the motor, the first pump, the second pump, the first drive transmission portion, and the second drive transmission portion are aligned in the first direction.

11. The image forming apparatus according to claim 9, wherein each of the first pump and the second pump is a diaphragm-pump.

12. The image forming apparatus according to claim 1, wherein the first developing unit, the second developing unit, and the pump unit are aligned in a second direction orthogonal to the first direction.

13. An image forming apparatus configured to form an image on a sheet, comprising:

an apparatus body including:

a first developing unit including a first developing container configured to accommodate a first toner, and a first developing roller configured to bear the first toner; and a second developing unit including a second developing container configured to accommodate a second toner, and a second developing roller configured to bear the second toner, a first toner container configured to accommodate the first toner and attachably and detachably supported on the apparatus body, the first toner container being configured to supply the first toner together with air toward the first developing container;

a second toner container configured to accommodate the second toner and supported attachably and detachably on the apparatus body, the second toner container being configured to supply the second toner together with air toward the second developing container, the second toner container being aligned in a first direction with the first toner container; and a pump unit including:

a first pump configured to convey air toward the first toner container, and a second pump configured to convey air toward the second toner container, wherein the first developing unit and the second developing unit are aligned in a second direction orthogonal to the first direction, wherein the first toner container and the second toner container are disposed closer to the first developing unit than to the second developing unit in the second direction, and wherein the pump unit is disposed so as to be overlapped with the first developing unit when viewed in a third direction perpendicular to both the first direction and the second direction.

14. The image forming apparatus according to claim 13, wherein the pump unit is disposed above the first developing unit.

* * * * *